(12) United States Patent
Uchida

(10) Patent No.: US 11,195,293 B2
(45) Date of Patent: Dec. 7, 2021

(54) INFORMATION PROCESSING DEVICE AND POSITIONAL INFORMATION OBTAINING METHOD

(71) Applicant: Sony Interactive Entertainment Inc., Tokyo (JP)

(72) Inventor: Masaki Uchida, Chiba (JP)

(73) Assignee: Sony Interactive Entertainment Inc., Tokyo (JP)

( * ) Notice: Subject to any disclaimer, the term of this patent is extended or adjusted under 35 U.S.C. 154(b) by 58 days.

(21) Appl. No.: 16/623,217

(22) PCT Filed: Jul. 13, 2018

(86) PCT No.: PCT/JP2018/026551
§ 371 (c)(1),
(2) Date: Dec. 16, 2019

(87) PCT Pub. No.: WO2019/017300
PCT Pub. Date: Jan. 24, 2019

(65) Prior Publication Data
US 2021/0056720 A1    Feb. 25, 2021

(30) Foreign Application Priority Data

Jul. 20, 2017 (JP) .............................. JP2017-141055

(51) Int. Cl.
*G06T 7/593* (2017.01)
*G06T 7/73* (2017.01)
(Continued)

(52) U.S. Cl.
CPC ............... *G06T 7/593* (2017.01); *G06T 7/73* (2017.01); *H04N 13/128* (2018.05); *G06T 2207/30204* (2013.01); *H04N 2013/0088* (2013.01)

(58) Field of Classification Search
CPC . G06T 7/593; G06T 7/73; G06T 2207/30204; G06T 7/246; H04N 13/128;
(Continued)

(56) References Cited

U.S. PATENT DOCUMENTS 6,864,877 B2   3/2005   Braun
7,218,310 B2   5/2007   Goldenberg
(Continued)

FOREIGN PATENT DOCUMENTS

EP    0999518 A1    5/2000
EP    1870856 A2   12/2007
(Continued)

OTHER PUBLICATIONS

International Preliminary Report on Patentability and Written Opinion for corresponding PCT Application No. PCT/2018/026551, 17 pages, dated Feb. 21, 2019.
(Continued)

*Primary Examiner* — Jerome Grant, II
(74) *Attorney, Agent, or Firm* — Matthew B. Dernier, Esq.

(57) ABSTRACT

An information processing device extracts an image of a marker from a photographed image, and obtains a position of a representative point of the marker in a three-dimensional space. Meanwhile, a position and an attitude corresponding to a time of photographing the image are estimated on the basis of an output value of a sensor included in a target object. A weight given to positional information of each marker is determined by using a target object model on the basis of the estimation, and positional information of the target object is calculated. Further, final positional information is obtained by synthesizing estimated positional information at a predetermined ratio, and the final positional information is output and fed back for a next estimation.

7 Claims, 14 Drawing Sheets

(51) Int. Cl.
*H04N 13/128* (2018.01)
*H04N 13/00* (2018.01)

(58) Field of Classification Search
CPC .......... H04N 2013/0088; G06F 3/0304; G06F 3/011; G06F 3/012
USPC ....................................................... 382/154
See application file for complete search history.

(56) References Cited

U.S. PATENT DOCUMENTS

| | | | |
|---|---|---|---|
| 9,007,445 B2 | 4/2015 | Oikawa | |
| 9,098,984 B2 | 8/2015 | Heubel | |
| 9,430,700 B2 | 8/2016 | Yagcioglu | |
| 9,542,745 B2 | 1/2017 | Moteki | |
| 9,753,537 B2 | 9/2017 | Obana | |
| 9,846,484 B2 | 12/2017 | Shah | |
| 9,881,417 B2 * | 1/2018 | Utsugi | G06T 17/10 |
| 9,940,716 B2 | 4/2018 | Chevassus | |
| 9,952,670 B2 | 4/2018 | Watanabe | |
| 9,983,671 B2 | 5/2018 | Adachi | |
| 10,175,761 B2 | 1/2019 | Cruz-Hernandez | |
| 10,347,093 B2 | 7/2019 | Rihn | |
| 2002/0030663 A1 | 3/2002 | Goldenberg | |
| 2002/0080112 A1 | 6/2002 | Braun | |
| 2002/0146628 A1 * | 10/2002 | Ota | G03F 7/70066 430/22 |
| 2009/0017911 A1 | 1/2009 | Miyazaki | |
| 2010/0091096 A1 | 4/2010 | Oikawa | |
| 2010/0113147 A1 * | 5/2010 | Chosogabe | A63F 13/53 463/30 |
| 2010/0150404 A1 | 6/2010 | Marks | |
| 2010/0164862 A1 | 7/2010 | Sullivan | |
| 2012/0044173 A1 * | 2/2012 | Homma | G06F 3/0488 345/173 |
| 2013/0057509 A1 | 3/2013 | Cruz-Hernandez | |
| 2013/0114854 A1 * | 5/2013 | Yoneyama | H04N 5/232123 382/103 |
| 2013/0171600 A1 * | 7/2013 | Yuasa | G09B 19/00 434/258 |
| 2013/0293362 A1 * | 11/2013 | Parazynski | G06F 3/0338 340/12.52 |
| 2014/0212000 A1 | 7/2014 | Yagcioglu | |
| 2014/0266644 A1 | 9/2014 | Heubel | |
| 2015/0070261 A1 | 3/2015 | Saboune | |
| 2015/0243016 A1 | 8/2015 | Moteki | |
| 2015/0323996 A1 | 11/2015 | Obana | |
| 2015/0324636 A1 | 11/2015 | Bentley | |
| 2015/0339819 A1 | 11/2015 | Chevassus | |
| 2016/0018430 A1 * | 1/2016 | Brade | G01N 35/1011 436/43 |
| 2016/0132117 A1 | 5/2016 | Adachi | |
| 2016/0162025 A1 | 6/2016 | Shah | |
| 2017/0045991 A1 | 2/2017 | Watanabe | |
| 2017/0092084 A1 | 3/2017 | Rihn | |
| 2017/0235364 A1 | 8/2017 | Nakamura | |
| 2018/0203509 A1 | 7/2018 | Yamano | |
| 2018/0373265 A1 * | 12/2018 | Ueda | G01C 21/20 |
| 2019/0111274 A1 * | 4/2019 | Saitoh | A61N 2/006 |

FOREIGN PATENT DOCUMENTS

| | | |
|---|---|---|
| EP | 3664032 A1 | 6/2020 |
| JP | 2002199056 A | 7/2002 |
| JP | 2003228453 A | 8/2003 |
| JP | 2004129120 A | 4/2004 |
| JP | 2005058404 A | 3/2005 |
| JP | 2007071782 A | 3/2007 |
| JP | 2007324829 A | 12/2007 |
| JP | 2008058102 A | 3/2008 |
| JP | 2009037582 A | 2/2009 |
| JP | 2009183751 A | 8/2009 |
| JP | 2010038707 A | 2/2010 |
| JP | 2010092436 A | 4/2010 |
| JP | 2012103852 | 5/2012 |
| JP | 2012226482 A | 11/2012 |
| JP | 2013052046 A | 3/2013 |
| JP | 2013054645 A | 3/2013 |
| JP | 2013243604 A | 12/2013 |
| JP | 2014179984 A | 9/2014 |
| JP | 2014528120 A | 10/2014 |
| JP | 2015053038 A | 3/2015 |
| JP | 2015513143 A | 4/2015 |
| JP | 2015118605 A | 6/2015 |
| JP | 2015158461 A | 9/2015 |
| JP | 2015200994 A | 11/2015 |
| JP | 2015215712 A | 12/2015 |
| JP | 2015228064 A | 12/2015 |
| JP | 2015228215 A | 12/2015 |
| JP | 2015230516 A | 12/2015 |
| JP | 2016002797 A | 1/2016 |
| JP | 2016131018 A | 7/2016 |
| JP | 2017037523 A | 2/2017 |
| JP | 2017062788 A | 3/2017 |
| WO | 2014167387 A1 | 10/2014 |
| WO | 2015059887 A1 | 4/2015 |
| WO | 2016038953 A1 | 3/2016 |
| WO | 2016186041 A1 | 11/2016 |
| WO | 2017043610 A1 | 3/2017 |

OTHER PUBLICATIONS

Extended European Search Report for corresponding EP Application No. 18835160.5, 7 pages, dated Feb. 17, 2021.
International Search Report for correspodning PCT Application No. PCT/JP2017/044074, 4 pages, dated Jan. 16, 2018.
International Search Report for related PCT Application No. PCT/JP2017/044072, 4 pages, dated Jan. 16, 2018.
International Preliminary Report on Patentability and Written Opinion for related PCT Application No. PCT/JP2017/044072, 15 pages, dated Jun. 27, 2019.
International Search Report for related PCT Application No. PCT/JP2017/044073, 2 pages, dated Jan. 23, 2018.
International Preliminary Report on Patentability and Written Opinion for related PCT Application No. PCT/JP2017/044073, 10 pages, dated Jun. 27, 2019.
International Preliminary Report on Patentability and Written Opinion for corresponding PCT Application No. PCTJP2017044074, 12 pages, dated Jun. 18, 2019.
International Search Report for related PCT Application No. PCT/JP2017/015563, 2 pages, dated Jun. 13, 2017.
International Search Report for related PCT Application No. PCT/JP2017/033925, 4 pages, dated Nov. 7, 2017.
International Search Report for related PCT Application No. PCT/JP2017/015740, 4 pages, dated Jul. 4, 2017.
International Search Report for related PCT Application No. PCT/JP2017/016552, 2 pages, dated Jun. 20, 2017.
International Preliminary Report on Patentability and Written Opinion for related PCT Application No. PCTJP2017044075, 15 pages, dated Jun. 27, 2019.
International Preliminary Report on Patentability and Written Opinion for related PCT Application No. PCT/JP2017/016552, 13 pages, dated Nov. 7, 2019.
International Search Report for corresponding application PCT/JP2018/026551, 4 pages, dated Aug. 7, 2018.

* cited by examiner (a) (b)

FIG.16
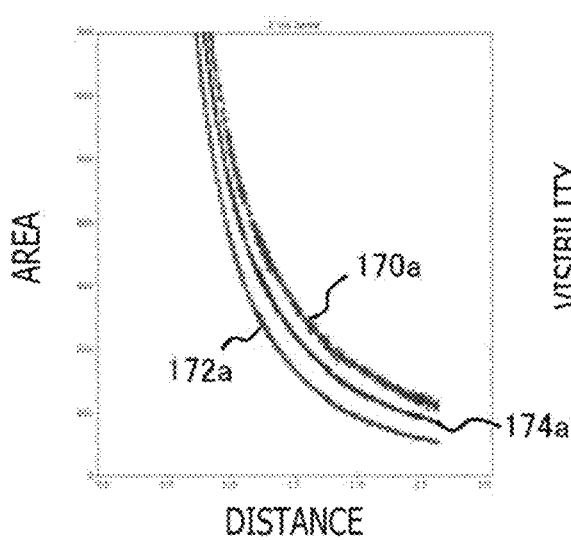
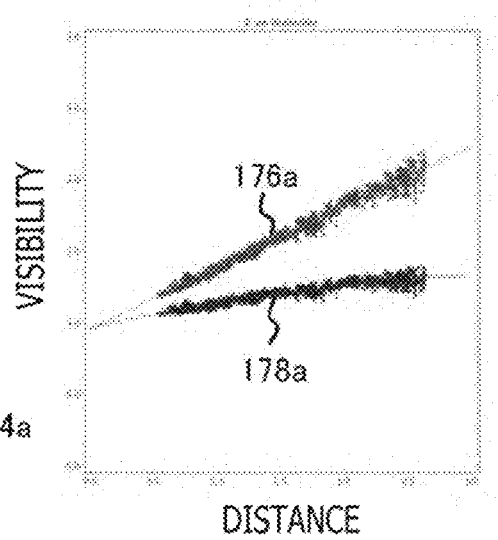
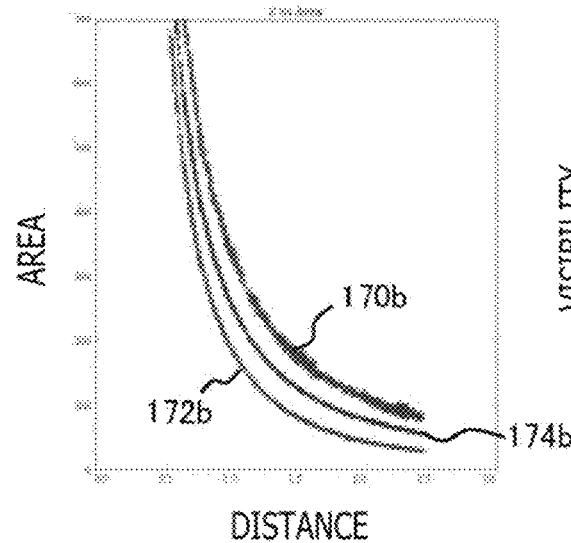
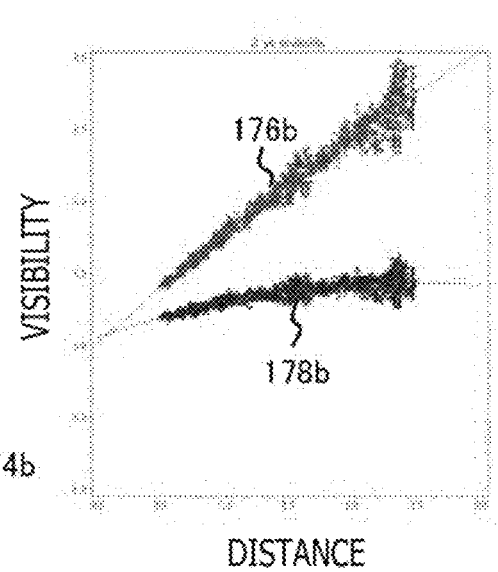

INFORMATION PROCESSING DEVICE AND POSITIONAL INFORMATION OBTAINING METHOD

TECHNICAL FIELD

The present invention relates to an information processing device and a positional information obtaining method that obtain positional information of a target object by image photographing.

BACKGROUND ART

A game is known which photographs the body of a user or a marker by a camera, replaces the region of an image thereof with another image, and displays the other image on a display (see PTL 1, for example). A user interface system is also known which receives a movement of a mouth or a hand photographed by a camera as an application operating instruction. Thus, technologies that photograph a real world, and display a virtual world reacting to a movement in the real world or perform certain information processing are used in a wide range of fields from portable terminals to leisure facilities irrespective of scales thereof.

CITATION LIST

Patent Literature

[PTL 1] European Patent Application Publication No. 0999518

SUMMARY

Technical Problem

In technologies as described above, how to obtain information related to the real world from a photographed image accurately is always an important challenge. A technology of recognizing the state of a target object on the basis of a marker of a known shape is advantageous in terms of distinction from other objects in a photographing field of view and processing efficiency. On the other hand, when the image of the marker as the basis changes due to a factor different from movement of the original target object, recognition accuracy is greatly affected. In order to stabilize the accuracy, the marker may be made to be a spherical body so that the shape of the image does not change irrespective of orientation of the marker, or a large number of dot-shaped markers may be provided and individual pieces of information may be handled so as to complement each other. However, this tends to be disadvantageous in terms of a degree of freedom of design and manufacturing cost.

The present invention has been made in view of such problems, and it is an object of the present invention to provide a technology that can perform target object position detection using a marker with stable accuracy.

Solution to Problem

A mode of the present invention relates to an information processing device. The information processing device is an information processing device for obtaining positional information of a target object having a plurality of markers, the information processing device including: a marker position obtaining section configured to extract images of the markers from a photographed image obtained by photographing the target object, and obtain position coordinates of representative points of the markers in a three-dimensional space; a target point position calculating section configured to obtain position coordinates of the target object using the position coordinates of the representative point of each of the markers; a position estimating section configured to estimate the position coordinates of the target object on a basis of an output value of a sensor included in the target object; and a filtering section configured to determine final position coordinates of the target object by synthesizing, at a predetermined ratio, the obtained position coordinates of the target object, the obtained position coordinates being obtained by the target point position calculating section, and the estimated position coordinates of the target object, the estimated position coordinates being estimated by the position estimating section, and output the final position coordinates.

Another mode of the present invention relates to a positional information obtaining method. The positional information obtaining method performed by an information processing device for obtaining positional information of a target object having a plurality of markers includes: a step of extracting images of the markers from a photographed image obtained by photographing the target object, and obtaining position coordinates of representative points of the markers in a three-dimensional space; a step of obtaining position coordinates of the target object using the position coordinates of the representative point of each of the markers; a step of estimating the position coordinates of the target object on a basis of an output value of a sensor included in the target object; and a step of determining final position coordinates of the target object by synthesizing, at a predetermined ratio, the obtained position coordinates of the target object, the obtained position coordinates being obtained in the obtaining step, and the estimated position coordinates of the target object, the estimated position coordinates being estimated in the estimating step, and outputting the final position coordinates.

It is to be noted that arbitrary combinations of the above constituent elements as well as modes obtained by converting expressions of the present invention between a method, a device, a system, a computer program, a recording medium on which the computer program is recorded, and the like are also effective as modes of the present invention.

Advantageous Effect of Invention

According to the present invention, target object position detection using markers can be performed with stable accuracy.

BRIEF DESCRIPTION OF DRAWINGS

FIG. 16 is diagrams depicting an effect of using a normalized visibility in the present embodiment.

DESCRIPTION OF EMBODIMENT

Embodiment 1

Figure 1:
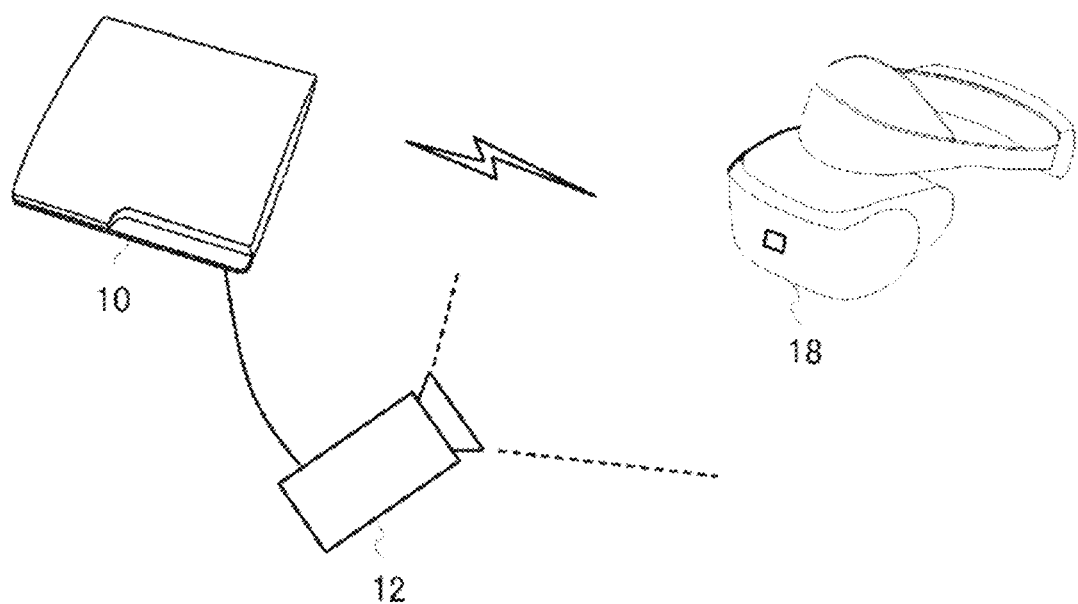
FIG. 1 is a diagram depicting an example of configuration of an information processing system to which a present embodiment can be applied.

FIG. 1 depicts an example of configuration of an information processing system to which the present embodiment can be applied. The information processing system includes: a head-mounted display (hereinafter referred to as an "HMD") 18 that a user wears to view a displayed image; an imaging device 12 that photographs a space including the HMD 18; and an information processing device 10 that performs information processing including processing of identifying the position of the HMD 18 on the basis of a photographed image.

In the present example, the HMD 18 establishes communication with the information processing device 10 by a known wireless communication technology such as Bluetooth (registered trademark) or the like. In addition, the imaging device 12 and the information processing device 10 establish communication with each other by wire. However, connecting methods are not intended to be limited to this. In addition, the information processing device 10 and the imaging device 12, or the information processing device 10 and the HMD 18 may be implemented integrally with each other. In addition, the system may further include an input device held and operated by the user and a flat-panel display or the like that displays an image similar to the image displayed on the HMD 18.

The imaging device 12 includes: a camera that photographs a target object such as the user wearing the HMD 18 or the like at a predetermined frame rate; and a mechanism that generates output data of a photographed image by subjecting the output signal of the camera to ordinary processing such as demosaicing processing or the like, and sends out the output data to the information processing device 10. The camera includes a visible light sensor used in an ordinary digital camera or an ordinary digital video camera, the visible light sensor being a charge coupled device (CCD) sensor, a complementary metal oxide semiconductor (CMOS) sensor, or the like. The camera included in the imaging device 12 may be only one camera, or may be a so-called stereo camera including two cameras arranged on a left and a right at a known interval.

In a case where the stereo camera is introduced, the position of the target object in a three-dimensional real space can be obtained with high accuracy, and information processing and image display by the information processing device 10 can be made more diverse. A method is widely known which identifies a distance of a subject from a camera by a principle of triangulation using a stereo image photographed by the stereo camera from a left viewpoint and a right viewpoint.

The information processing device 10 performs necessary information processing using the data transmitted from the imaging device 12, and generates output data such as an image and sound or the like. The information processing device 10 in the present embodiment identifies the position and attitude of the target object wearing a marker photographed by the imaging device on the basis of an image of the marker. For example, a plurality of markers are provided on the external surface of the HMD 18, images of the markers are extracted from a photographed image, and positional information of each of the markers in the three-dimensional space is obtained. When those pieces of information are integrated, the HMD 18, or in turn the position and attitude of the head of the user can be identified. When this processing is repeated in each frame of the photographed image, movement of the viewpoint position and line of sight of the user can be identified. It is thus possible to realize virtual reality (VR) by, for example, rendering an image of a virtual world in a field of view according to the movement of the viewpoint position and line of sight of the user, and displaying the image on the HMD 18.

However, the markers are not limited to markers provided to the HMD 18, but may be provided to an input device held by the user, or may be directly attached to the user or the like. The subsequent description will be made of a mode in which markers are provided to the HMD 18. However, when the markers are attached to another object, the HMD 18 is not necessary. In either case, the form of the markers and the kind of the target object are not limited as long as an object, a person, or the like having the markers attached thereto is set as the target object and the positional information of the target object is obtained using images of the markers. In addition, the contents of processing performed by the information processing device 10 using information on the position and attitude of the target object which position and attitude are identified using the markers are not particularly limited, but may be determined as appropriate according to functions desired by the user, the contents of an application, or the like.

The HMD 18 is a display device that displays an image on a display panel such as an organic electroluminescence (EL) panel or the like located in front of the eyes of the user when the user wears the display device on the head of the user. The image may be made to be viewed three-dimensionally by, for example, generating parallax images as viewed from the left and right viewpoints, and displaying the respective parallax images in a left region and a right region formed by dividing the display screen into two parts. However, the present embodiment is not intended to be limited to this, but one image may be displayed on the entire display screen. The HMD 18 may further include speakers and earphones that output sound to positions corresponding to the ears of the user.

Figure 2:
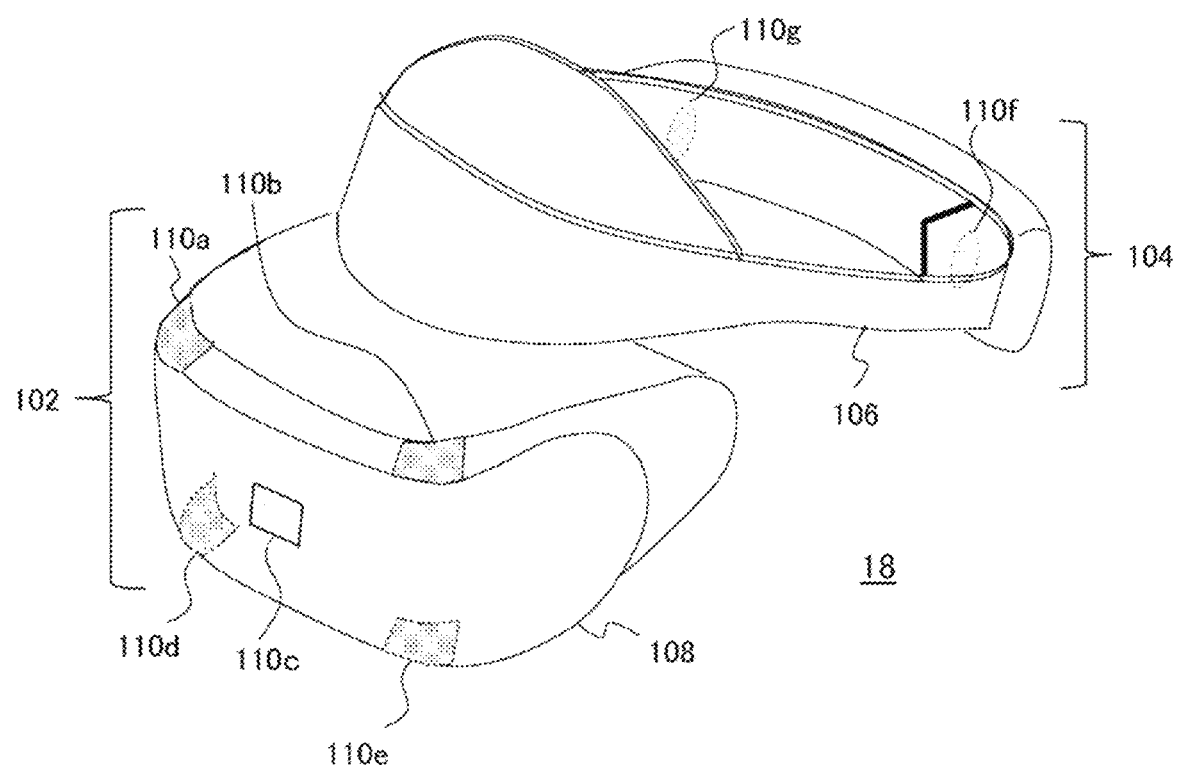
FIG. 2 is a diagram depicting an example of the external shape of a head-mounted display (HMD) in the present embodiment.

FIG. 2 depicts an example of the external shape of the HMD 18. In the present example, the HMD 18 is constituted of an output mechanism part 102 and a mounting mechanism part 104. The mounting mechanism part 104 includes a mounting band 106 that wraps around the head of the user and realizes fixation of the device when the user puts on the mounting mechanism part 104. The mounting band 106 is of a material or a structure that can be adjusted in length according to the head circumference of each user. For example, an elastic body such as rubber or the like may be used, or a buckle, a gear, or the like may be used.

The output mechanism part 102 includes a casing 108 having such a shape as to cover the left and right eyes of the user in a state in which the user wears the HMD 18. A display panel is provided within the output mechanism part 102 so as to squarely face the eyes when the HMD 18 is mounted. Then, markers 110a, 110b, 110c, 110d, and 110e that emit light in a predetermined color are provided to the external surface of the casing 108. Though the number, arrangement, and shape of the markers are not particularly limited, roughly rectangular markers are provided to four corners and a center of a casing front surface of the output mechanism part 102 in the illustrated example.

Further, oval markers 110f and 110g are provided also to both side surfaces in the rear of the mounting band 106. With the markers thus arranged, even when the user faces to a side or faces to the rear with respect to the imaging device 12, those states can be identified on the basis of the number and positions of images of the markers in the photographed image. Incidentally, the markers 110d and 110e are located on the lower side of the output mechanism part 102, and the markers 110f and 110g are located on the outside of the mounting band 106. The markers 110d and 110e and the markers 110f and 110g therefore should not be seen from the viewpoint of FIG. 2. Thus, the peripheries of the markers are represented by dotted lines. It suffices for the markers to have a predetermined color and shape, and to be in a form distinguishable from other objects in a photographing space. In some cases, the markers do not have to emit light.

Figure 3:
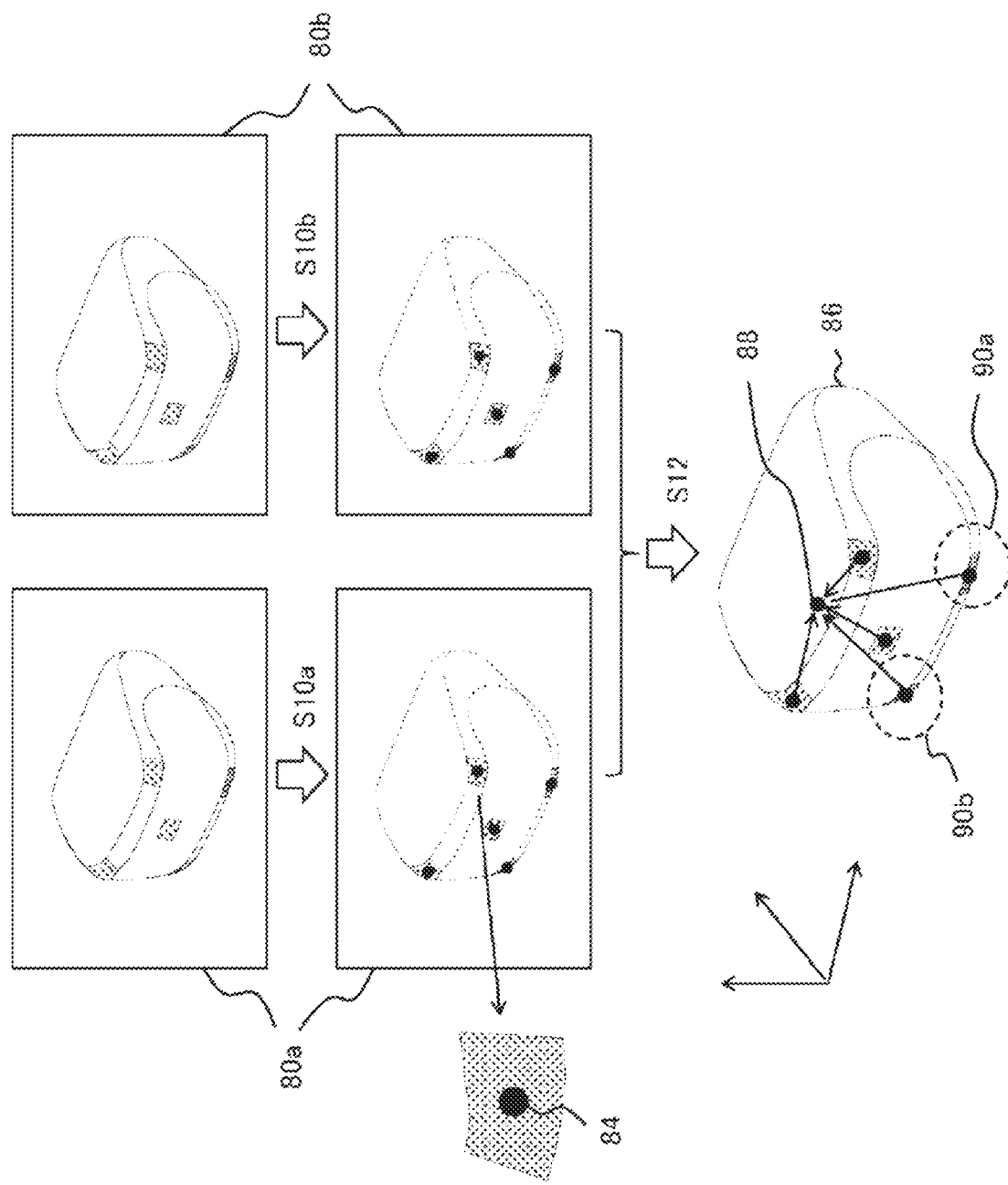
FIG. 3 is a diagram of assistance in explaining a basic processing procedure in which an information processing device obtains positional information of the HMD in a three-dimensional space from images of markers in the present embodiment.

FIG. 3 is a diagram of assistance in explaining a basic processing procedure for the information processing device 10 to obtain positional information of the HMD 18 in a three-dimensional space from images of the markers in the present embodiment. In the case where the imaging device 12 is formed by the stereo camera, the left and right cameras photograph a space to be photographed in same timing, and data of an image 80a of a left viewpoint and an image 80b of a right viewpoint are thereby transmitted to the information processing device 10 at a predetermined frame rate. In the figure, only an image of the output mechanism part 102 of the HMD 18 is schematically depicted for ease of understanding.

As depicted in the figure, as compared with the image 80a of the left viewpoint, an image of the HMD 18 appears more to the left side in the image 80b of the right viewpoint. The information processing device 10 first extracts images of the markers from each of the images 80a and 80b on the basis of luminance, color, or the like (S10a and S10b). Then, a center of gravity of a region of the image of each marker is obtained. In the illustrated example, the position of a center of gravity 84 is represented by a black circle in an image of one marker in the image 80a of the left viewpoint, the image of the one marker being displayed on an enlarged scale on the left side.

Next, correspondence between gravity center positions of a same marker in the left and right images 80a and 80b is identified from the positions in the images or the like, and a distance of the center of gravity from an imaging plane is obtained by applying a principle of triangulation using a positional displacement between the gravity center positions in a horizontal direction as a parallax. Position coordinates in the three-dimensional space of the center of gravity of each marker are obtained by back-projecting the gravity center positions in the images into the three-dimensional space on the basis of the distance (S12). Because the disposition of each marker in the HMD 18 is known, a predetermined position in the HMD 18, for example, the position in the three-dimensional space of a point 88 corresponding to the middle of the forehead of the user can be derived from relative positional relation to the center of gravity of each marker.

Also in a case where the imaging device 12 is a monocular camera, the position in the three-dimensional space of a center of gravity can be derived when a distance from the imaging plane is obtained on the basis of the size of the marker, intervals between a plurality of markers, or the like. Incidentally, while the position of the center of gravity is used as a representative value of the position of the marker in the present embodiment, the representative point may not necessarily be the center of gravity. For example, the representative point may be determined by using a vertex of the marker, a middle point of a side, or the like.

The positional information of the point 88 as a target (which point will hereinafter be referred to as a "target point") which positional information is derived in the above-described method tends to be affected by appearance of the markers from the imaging device. For example, when the orientation of the HMD 18 changes, markers are not easily seen or are completely out of sight of the imaging device 12. In the illustrated example, the images of the markers 90a and 90b arranged on the lower side of the HMD 18 are narrowed due to inclination thereof with respect to the imaging plane.

In this case, centers of gravity are obtained from a small number of pixels constituting the images of the markers, and many errors tend to be included as compared with a marker squarely facing the imaging plane. Here, when the user looks further downward, for example, and the angle of depression of the HMD 18 is thus increased, the markers 90*a* and 90*b* disappear from the photographed image. Then, the position of the point 88 needs to be calculated from only the centers of gravity of the images of the remaining markers. This also tends to produce errors. In addition, the number of centers of gravity serving as a basis for calculating the position of the target point changes at a moment at which the markers 90*a* and 90*b* become out of sight of the imaging device 12. The derived positional information can therefore change suddenly.

When the positional information of the target point is discontinuous, discontinuity also occurs in various kinds of processing performed by using the positional information of the target point. For example, when an image generated using the positional information is displayed on the HMD 18, a virtual viewpoint of the image makes discontinuous movement different from an actual movement of the head, and thus may cause an uncomfortable feeling to the viewer. Making provision by increasing the number of markers, for example, may stabilize the accuracy of the positional information, but causes a problem in terms of manufacturing cost and power consumption.

Figure 4:
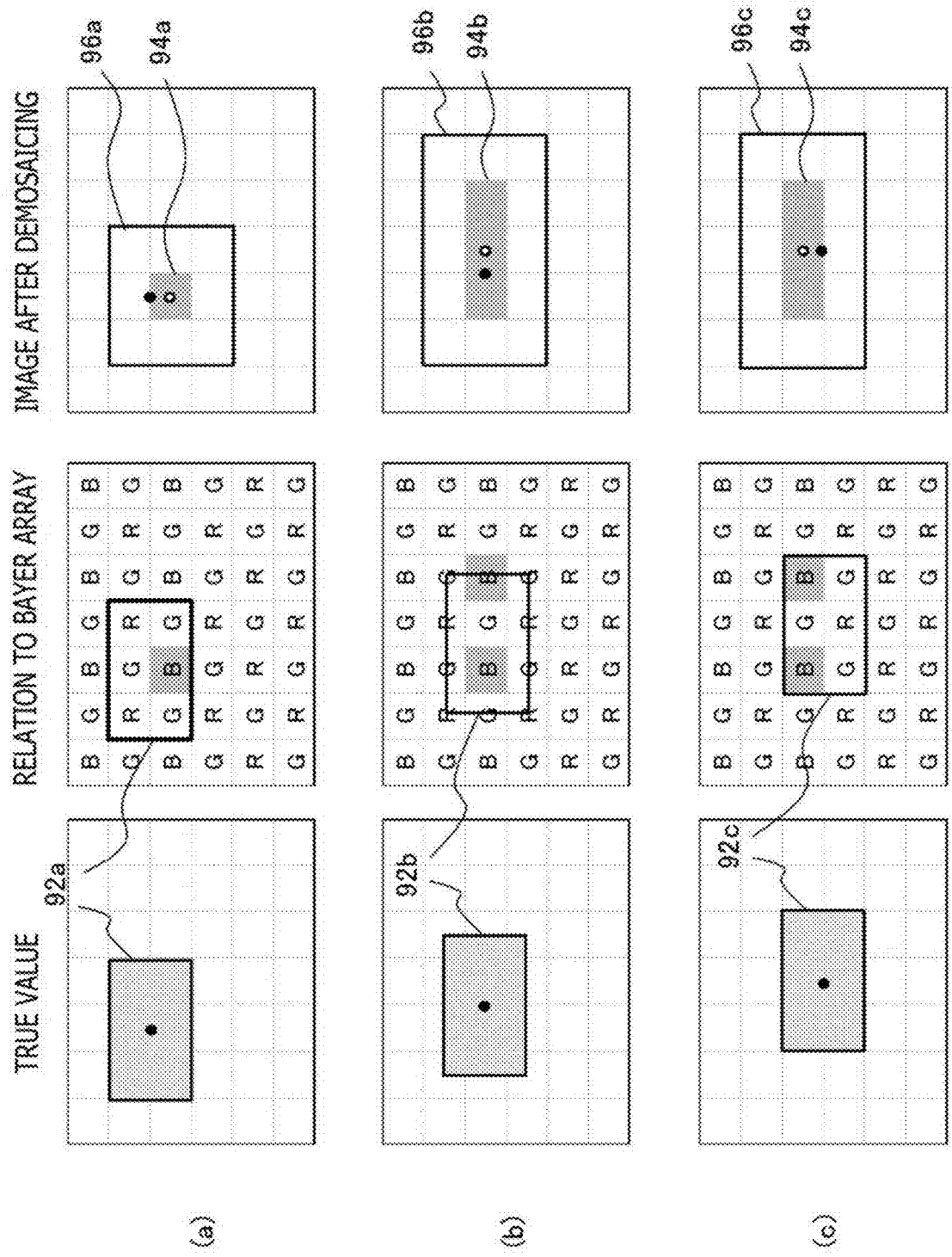
FIG. 4 is diagrams of assistance in explaining an error occurring in the position of a center of gravity depending on relation between an original image of a marker and a sensor arrangement of an imaging plane.

In addition, supposing that the imaging device 12 is a camera that photographs an ordinary color image, an error can occur in the position of a center of gravity depending also on relation between a color in which a sensor corresponding to each pixel obtains a luminance value and a range that light from the marker reaches, that is, an original image of the marker. FIG. 4 is diagrams of assistance in explaining an error occurring in the position of a center of gravity depending on relation between an original image of a marker and a sensor arrangement of the imaging plane. Nine rectangles in the figure represent an image plane, and regions demarcated by internal lattices represent pixels.

First, suppose that in the state of (a), a shaded rectangular region indicated by "true value" at a left end is an original marker image 92*a*. A true center of gravity at this time is indicated by a black dot. Supposing that sensors of the imaging device 12 are in an ordinary Bayer array, as indicated by "relation to Bayer array" at a center in the diagram, each sensor obtains luminance of one of red (R), green (G), and blue (B). Therefore, sensors that can correctly detect light from the marker are limited among sensors within the region of the original marker image 92*a*. Supposing that the light of the marker is blue, for example, the sensor of blue (B) shaded in the illustrated example detects luminance close to the light from the marker, but the other sensors have a considerably lower luminance value.

A so-called RAW image detected in the Bayer array is subjected to interpolation for each color by subsequent demosaicing processing, and a color image in which each pixel has information of three colors is generated. At this time, the output luminance values of the sensor detecting the blue color within the region of the original marker image 92*a* and a sensor detecting the blue color located outside the region with one pixel interposed therebetween are interpolated. As a result, in the color image, as indicated by "image after demosaicing" at a right end in the diagram, a region 96*a* including a shaded pixel 94*a* indicating the original blue luminance value and pixels on the periphery of the pixel 94*a* which pixels indicate an interpolated luminance value is a region close to the color of the marker, that is, a marker image. However, the pixels on the periphery of the pixel 94*a* have lower luminance than the pixel 94*a*.

When image processing is performed by using such a color image, and the blue region 96*a* is detected as a marker image, a position indicated by a white dot is calculated as a center of gravity, and is therefore shifted to a lower side by 0.5 pixel from an original center of gravity represented by a black dot. (b) depicts a state in which the marker is displaced by a minute amount from the state of (a). Specifically, an original marker image 92*b* is displaced by 0.5 pixel in a right direction and a downward direction. When relation between the image at this time and the sensor arrangement is observed, the original marker image 92*b* overlaps also another blue sensor than the same blue sensor as in (a). Hence, these sensors detect luminance close to the light from the marker.

When this is subjected to demosaicing processing, a region 96*b* including a pixel group 94*b* indicating a luminance value close to the original blue color and pixels on the periphery of the pixel group 94*b* appears as a marker image. When the blue region 96*b* is detected as a marker image, a position indicated by a white dot is calculated as a center of gravity, and is therefore shifted to a right side by 0.5 pixel from an original center of gravity represented by a black dot. In the state of (c) in which the marker is further displaced in the right direction and the downward direction by 0.5 pixel, two blue sensors are completely included within the region of an original marker image 92*c*.

When this is subjected to demosaicing processing, a region 96*c* including a pixel group 94*c* indicating a luminance value close to the original blue color and pixels on the periphery of the pixel group 94*c* appears as a marker image. When the blue region 96*c* is detected as a marker image, a position indicated by a white dot is calculated as a center of gravity, and is therefore shifted to an upper side by 0.5 pixel from an original center of gravity represented by a black dot. Marker images are actually larger than those depicted in the figure in many cases. However, the principle that the contour of an image in the color image changes and the center of gravity is shifted depending on the color of light detected by a sensor located in the vicinity of the contour is similar to that illustrated in the figure.

In addition, the more the marker is separated from the imaging device 12 or the larger the angle of the marker to the imaging plane becomes, the smaller the image becomes, and the closer to the states depicted in the figure the image becomes. For example, even when minute vibration that the user himself/herself wearing the HMD 18 does not notice occurs, that is, when the center of gravity calculated as depicted in the figure is shifted, a display image generated by using the positional information vibrates, and may cause a feeling of strangeness or an indisposition to the user.

Accordingly, in the present embodiment, an error caused by a marker not easily seen from the imaging device 12 is reduced by adjusting a weight at a time of obtaining the position of the target point for each marker according to an angle between the marker and the imaging plane. In addition, an IMU sensor is provided to the HMD 18, and vibration and discontinuity of positional information are suppressed by integrating the positional information of the HMD 18 which positional information is estimated from an output value of the IMU sensor and positional information obtained from images of the markers in a photographed image.

Figure 5:
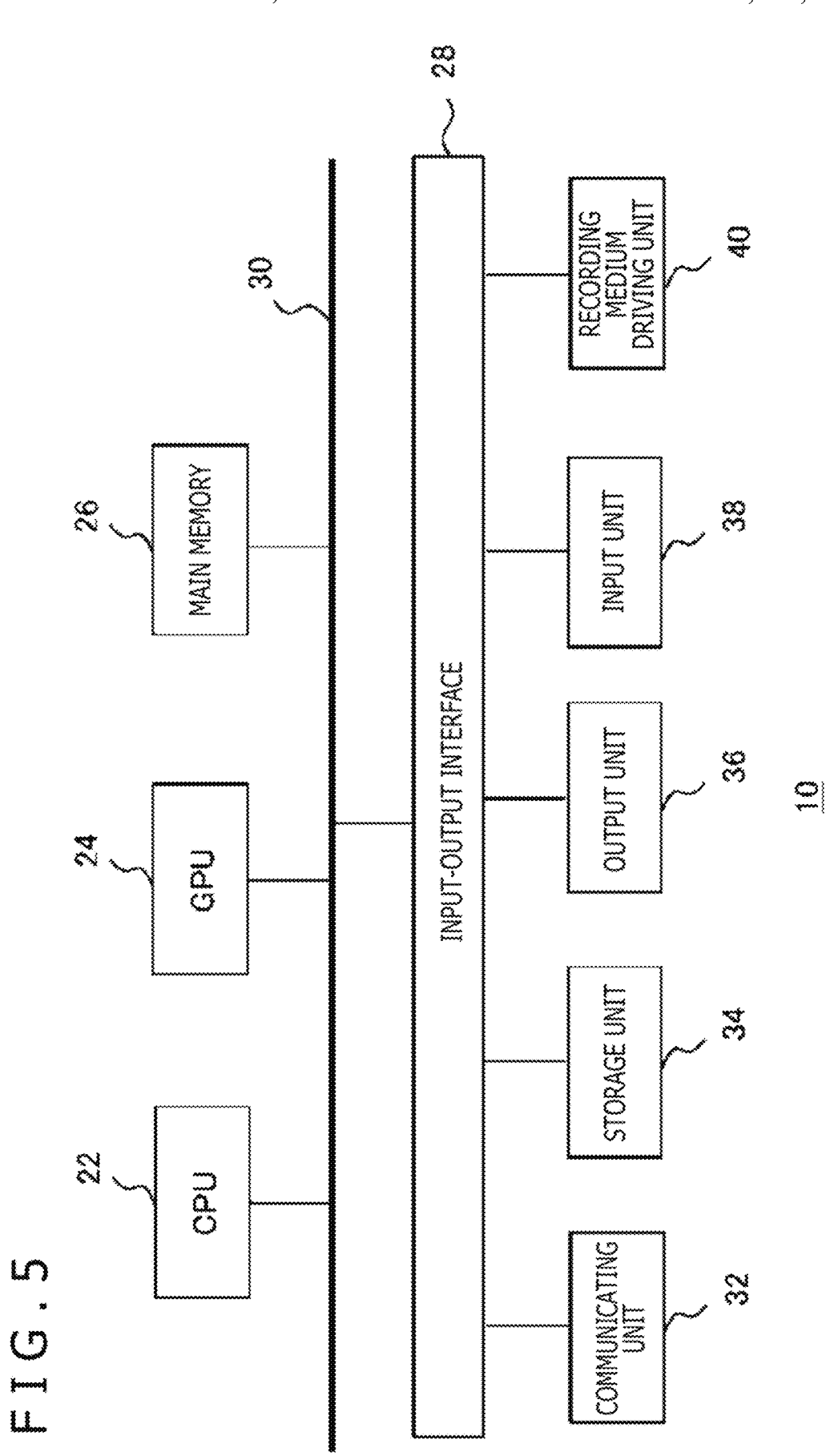
FIG. 5 is a diagram depicting an internal circuit configuration of the information processing device in the present embodiment.

FIG. 5 depicts an internal circuit configuration of the information processing device 10. The information processing device 10 includes a central processing unit (CPU) 22, a graphics processing unit (GPU) 24, and a main memory 26. These parts are interconnected via a bus 30. An input-output interface 28 is further connected to the bus 30. The input-output interface 28 is connected with: a communicating unit 32 including a peripheral device interface such as a universal serial bus (USB), Institute of Electrical and Electronics Engineers (IEEE) 1394, or the like and a network interface of a wired or wireless local area network (LAN); a storage unit 34 such as a hard disk drive, a nonvolatile memory, and the like; an output unit 36 that outputs data to the HMD 18; an input unit 38 that inputs data from the imaging device 12 and the HMD 18; and a recording medium driving unit 40 that drives a removable recording medium such as a magnetic disk, an optical disk, a semiconductor memory, or the like.

The CPU 22 controls the whole of the information processing device 10 by executing an operating system stored in the storage unit 34. The CPU 22 also executes various kinds of programs read from the removable recording medium and loaded into the main memory 26, or downloaded via the communicating unit 32. The GPU 24 has functions of a geometry engine and functions of a rendering processor. The GPU 24 performs rendering processing according to a rendering instruction from the CPU 22, and stores a display image in a frame buffer not depicted in the figure. Then, the display image stored in the frame buffer is converted into a video signal, and the video signal is output to the output unit 36. The main memory 26 is formed by a random access memory (RAM). The main memory 26 stores a program and data necessary for processing.

Figure 6:
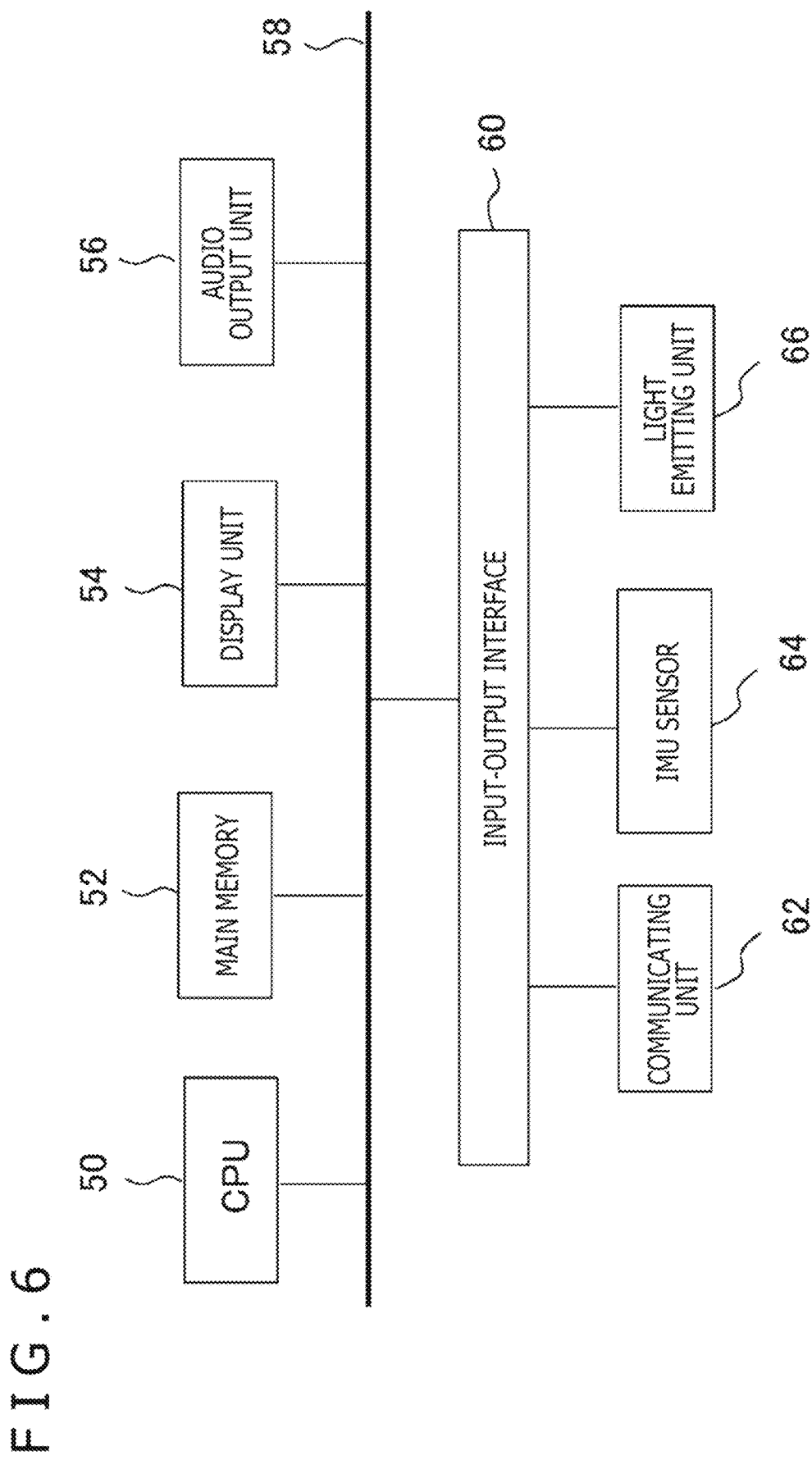
FIG. 6 is a diagram depicting an internal circuit configuration of the HMD in the present embodiment.

FIG. 6 depicts an internal circuit configuration of the HMD 18. The HMD 18 includes a CPU 50, a main memory 52, a display unit 54, and an audio output unit 56. These parts are interconnected via a bus 58. An input-output interface 60 is further connected to the bus 58. The input-output interface 60 is connected with a communicating unit 62 including a network interface of a wired or wireless LAN, an IMU sensor 64, and a light emitting unit 66.

The CPU 50 processes information obtained from each part of the HMD 18 via the bus 58, and supplies output data obtained from the information processing device 10 to the display unit 54 and the audio output unit 56. The main memory 52 stores a program and data necessary for processing in the CPU 50. However, depending on an application to be executed and device design, the information processing device 10 performs almost all of processing, and it may suffice for the HMD 18 only to output data transmitted from the information processing device 10. In this case, the CPU 50 and the main memory 52 can be replaced with simpler devices.

The display unit 54 is formed by a display panel such as a liquid crystal panel, an organic EL panel, or the like. The display unit 54 displays an image in front of the eyes of the user wearing the HMD 18. As described above, a stereoscopic view may be realized by displaying a pair of parallax images in regions corresponding to the left and right eyes. The display unit 54 may further include a pair of lenses that is located between the display panel and the eyes of the user when the HMD 18 is mounted, and enlarges the viewing angle of the user.

The audio output unit 56 is formed by speakers or earphones arranged at positions corresponding to the ears of the user when the HMD 18 is mounted. The audio output unit 56 makes the user hear sound. The number of channels of the output sound is not particularly limited; the output sound may be any of monophonic sound, stereo sound, and surround sound. The communicating unit 62 is an interface for transmitting and receiving data to and from the information processing device 10. The communicating unit 62 can be implemented by using a known wireless communication technology such as Bluetooth (registered trademark) or the like. The IMU sensor 64 includes a gyro sensor and an acceleration sensor. The IMU sensor 64 obtains angular velocity and acceleration of the HMD 18. An output value of the sensor is transmitted to the information processing device 10 via the communicating unit 62. The light emitting unit 66 is an element emitting light in a predetermined color or a set of such elements. The light emitting unit 66 constitutes the markers provided at a plurality of positions on the external surface of the HMD 18 depicted in FIG. 2.

Figure 7:
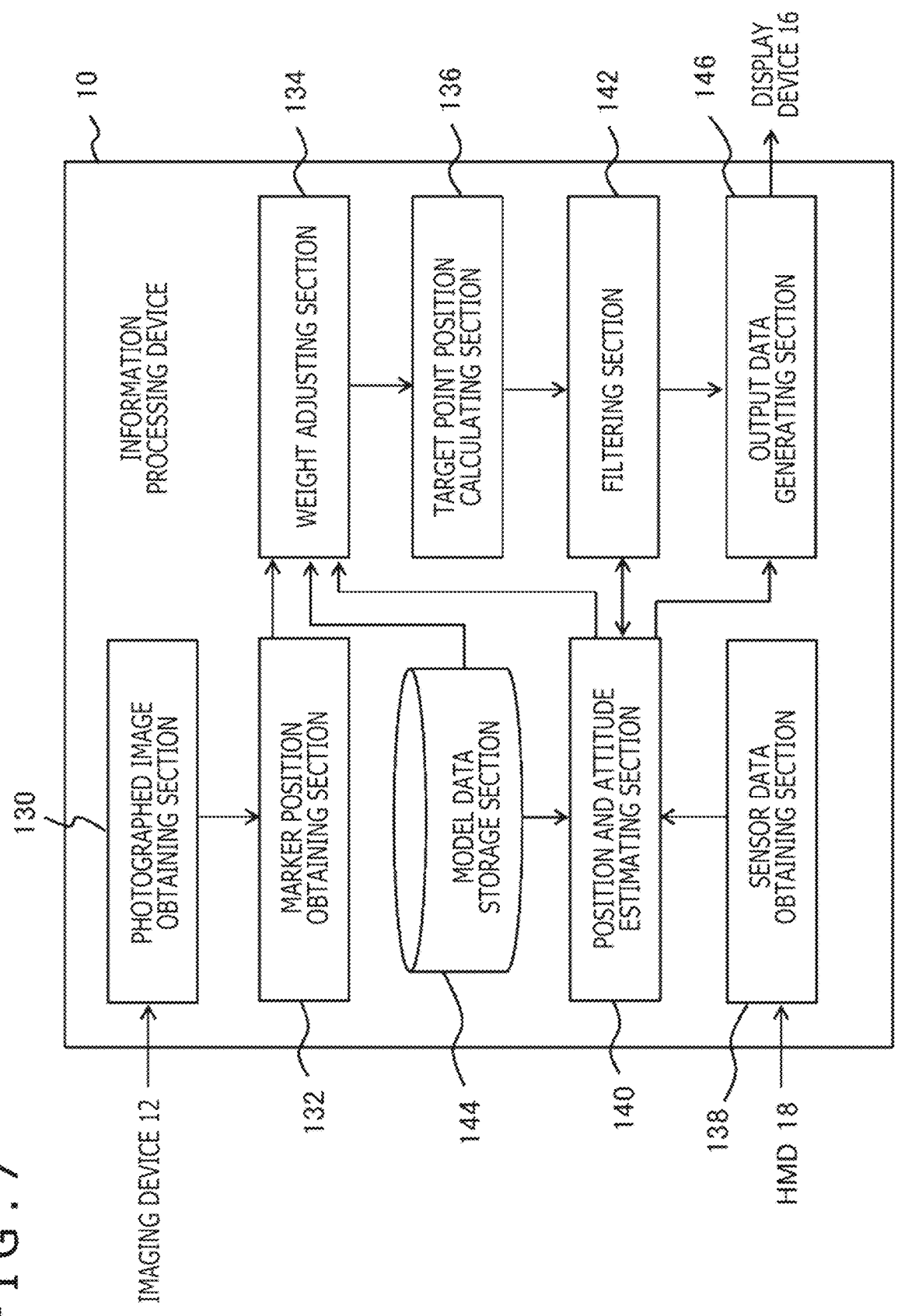
FIG. 7 is a diagram depicting a configuration of functional blocks of the information processing device in the present embodiment.

FIG. 7 depicts a configuration of functional blocks of the information processing device 10. Each functional block depicted in FIG. 7 can be implemented by a configuration of the CPU, the GPU, the memory, and the like depicted in FIG. 5 in terms of hardware, and is implemented by a program that is loaded from a recording medium or the like to the memory and exerts various functions such as a data input function, a data retaining function, an image processing function, an input-output function, and the like in terms of software. Hence, it is to be understood by those skilled in the art that these functional blocks can be implemented in various forms by only hardware, only software, or combinations of hardware and software, and are not to be limited to one of the forms.

The information processing device 10 includes: a photographed image obtaining section 130 that obtains data of a photographed image from the imaging device 12; a marker position obtaining section 132 that extracts an image of a marker from the photographed image, and obtains the position in the three-dimensional space of a center of gravity; a weight adjusting section 134 that adjusts the weight coefficient of each marker from relation between the surface of the marker and the imaging plane; and a target point position calculating section 136 that calculates the position of the target point from the center of gravity of each marker by using the adjusted weight coefficient. The information processing device 10 further includes: a sensor data obtaining section 138 that obtains the output value of the IMU sensor 64 from the HMD 18; a position and attitude estimating section 140 that estimates the position and attitude of the HMD 18 on the basis of the output value of the sensor; a model data storage section 144 that stores a three-dimensional target object model of the HMD 18; a filtering section 142 that filters the position of the target point which is calculated by the target point position calculating section 136 by using an estimation result of the position and attitude estimating section 140; and an output data generating section 146 that generates output data such as data indicating the filtered positional information, a display image using the data indicating the filtered positional information, or the like, and outputs the output data to a display device 16 or the like.

The photographed image obtaining section 130 is implemented by the input unit 38, the CPU 22, the main memory 26, and the like in FIG. 5. The photographed image obtaining section 130 sequentially obtains data of a photographed image obtained by photographing of the imaging device 12 at a predetermined frame rate, and supplies the data to the marker position obtaining section 132. In the case where the imaging device 12 is formed by a stereo camera, the data of moving images respectively photographed by a left camera and a right camera is sequentially obtained.

The marker position obtaining section 132 is implemented by the CPU 22, the main memory 26, and the like in FIG. 5. The marker position obtaining section 132 detects images of the markers from the photographed image as in S10a and S10b in FIG. 3, and obtains the position coordinates of each center of gravity in the image. Then, in the case where a stereo image is used, images of a same marker are associated with each other in a left image and a right image, and the position coordinates of a center of gravity in the three-dimensional space are obtained on the basis of a positional displacement in the horizontal direction between centers of gravity in those images.

The sensor data obtaining section 138 is implemented by the input unit 38, the communicating unit 32, the CPU 22, the main memory 26, and the like in FIG. 5. The sensor data obtaining section 138 obtains the output value of the IMU sensor 64, that is, angular velocity and acceleration from the HMD 18 at a predetermined rate, and supplies the output value to the position and attitude estimating section 140. The position and attitude estimating section 140 is implemented by the CPU 22, the GPU 24, the main memory 26, and the like in FIG. 5. The position and attitude estimating section 140 estimates the position and attitude of the HMD 18 at a photographing time of a next frame by using the output value of the IMU sensor 64 and positional information from the filtering section 142. A method of obtaining an attitude by integral operation using triaxial angular velocity is widely known. In addition, subsequent position and attitude information can be estimated from previous position and attitude information by converting the output value from a sensor coordinate system to a world coordinate system by using the attitude information.

The weight adjusting section 134 is implemented by the CPU 22, the GPU 24, the main memory 26, and the like in FIG. 5. The weight adjusting section 134 reads the data of the three-dimensional target object model of the HMD 18, the three-dimensional target object model being stored in the model data storage section 144, and disposes the HMD 18 in a position and an attitude estimated by the position and attitude estimating section 140 in a virtual three-dimensional space in which the imaging plane of the imaging device 12 is disposed. Then, a weight coefficient given to the gravity center position of each marker is determined according to an angle between a normal to each marker in the target object model of the HMD 18 and a projection vector directed from each marker to the imaging plane.

The target point position calculating section 136 is implemented by the CPU 22, the main memory 26, and the like in FIG. 5. The target point position calculating section 136 calculates the position coordinates of the target point by weighting the gravity center position of each marker by using an adjusted weight as a coefficient, and further taking an average after giving a weight based on a distance to the target point. The filtering section 142 is implemented by the CPU 22, the main memory 26, and the like in FIG. 5. The filtering section 142 performs filtering by synthesizing the position coordinates of the target point which are calculated by the target point position calculating section 136 and the position coordinates of the target point which are estimated by the position and attitude estimating section 140 at a predetermined ratio, and derives final position coordinates of the target point.

At this time, the synthesizing ratio may be adjusted according to movement of the HMD 18. For example, in a state in which the head substantially stands still, vibration and discontinuity of the positional information as described above are more easily recognized via the output data such as the display image or the like. Hence, in such a case, the synthesis is performed after the ratio of the positional information estimated by the position and attitude estimating section 140 is increased. On the other hand, when the ratio of the positional information estimated by the position and attitude estimating section 140 is allowed to remain high, estimation errors may be accumulated, and result in a deviation from an actual position. Accordingly, when the head makes a large movement, in which vibration and discontinuity are not easily recognized, the synthesis is performed after the ratio of the positional information calculated by the target point position calculating section 136 is increased.

The thus filtered positional information is returned to the position and attitude estimating section 140, and is thereby used for estimation of the position and the attitude in the photographed image of a next frame. The output data generating section 146 is implemented by the CPU 22, the GPU 24, the main memory 26, the output unit 36, the communicating unit 32, and the like in FIG. 5. The output data generating section 146 performs predetermined information processing using the positional information of the target point which positional information is output by the filtering section 142, and generates the data of an image and sound to be output as a result of the information processing. For example, as described above, a virtual world as viewed from a viewpoint corresponding to the position and attitude of the head of the user is rendered as a left parallax image and a right parallax image. At this time, information on the attitude is obtained from the position and attitude estimating section 140.

When the parallax images are displayed in front of the left and right eyes in the HMD 18, and sound in the virtual world is output, the user can obtain a feeling as if the user entered the virtual world. Alternatively, the positional information from the filtering section 142 and the attitude information from the position and attitude estimating section 140 may be simply output as output data to an information processing device provided separately. In this case, the information processing device 10 depicted in the figure functions as a state detecting device for the HMD 18.

Figure 8:
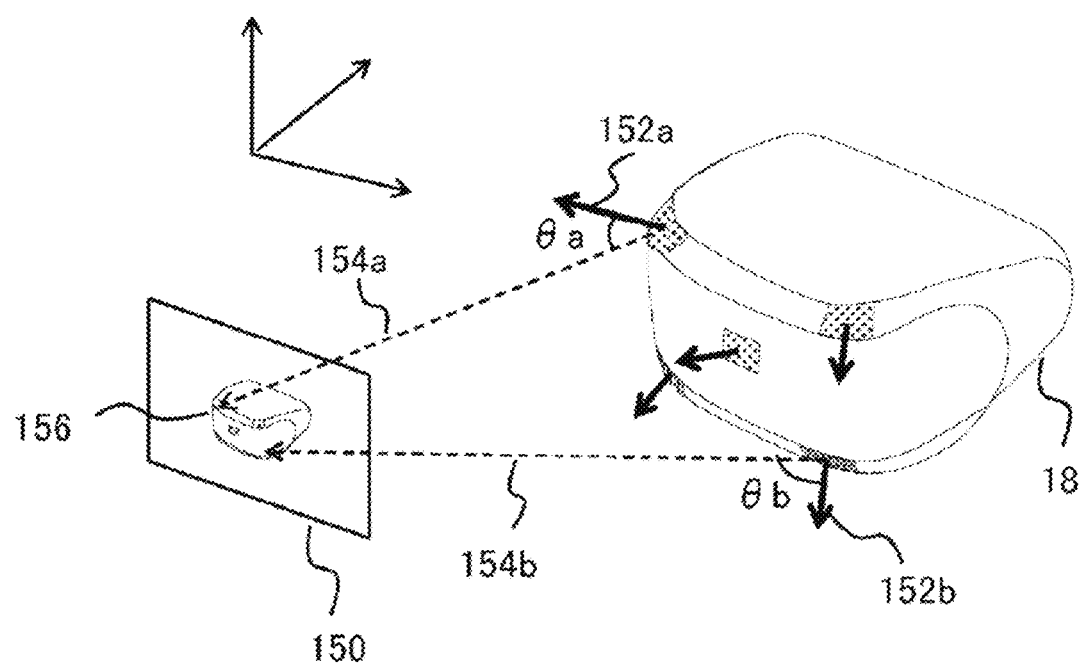
FIG. 8 is a diagram of assistance in explaining a method of calculating a weight coefficient given to each marker by a weight adjusting section in the present embodiment.

FIG. 8 is a diagram of assistance in explaining a method of calculating a weight coefficient given to each marker by the weight adjusting section 134. The figure depicts a state in which the imaging plane 150 of the imaging device 12 and the target object model of the HMD 18 are arranged in the virtual three-dimensional space as described above. The position and inclination of each marker in the target object model are known, needless to say. Thus, when the target object model of the HMD 18 is disposed according to the position and the attitude estimated by the position and attitude estimating section 140, normal vectors (for example, normal vectors 152*a* and 152*b*) of markers in the virtual three-dimensional space are obtained.

Meanwhile, an image 156 of the HMD 18 which is an image formed by projecting the target object model onto the imaging plane 150 is a so-called ideal form of a photographed image. An angle of the surface of a marker with respect to the imaging plane corresponds to an angle (for example, angles $\theta a$ and $\theta b$) formed between a vector from each marker of the target object model to a corresponding position in the image 156, that is, a projection vector (for example, projection vectors 154*a* and 154*b*) converging on an optical center of the imaging device 12, and a normal vector. That is, the larger the angle is, the smaller the area of the image is, and the larger an error in the gravity center position is. In addition, irrespective of the angle of the surface, the smaller the area of the marker appearing in the photographed image is, the more the gravity center position tends to include an error.

Hence, qualitatively, the larger the angle formed between the normal vector and the projection vector is, and the smaller the area of the image in the model is, the more the weight given to the gravity center position of the marker is made to be reduced. Here, when an inner product of the normal vector and the projection vector and the area of the image are obtained for each polygon constituting the surface of the marker in the target object model, and products thereof are summed in marker units, the weight coefficient can be determined more precisely, including a case where the marker surface is a curved surface. That is, a weight coefficient $W_n$ for an nth marker can be determined as follows.

[Math. 1]

$$W_n = \sum_{i=1}^{a} \{(v_{pro}(i) \cdot v_{normal}(i)) \cdot S(i)\} \quad \text{(Equation 1)}$$

where i ($1 \leq i \leq a$) is identification numbers of a polygons constituting the nth marker, $V_{pro}(i)$ and $V_{normal}(i)$ are respectively the projection vector and the normal vector of an ith polygon, and S(i) is the area of an image of the ith polygon. The target point position calculating section 136 obtains the position coordinates Position$_{image}$ of the target point as follows by weighting the gravity center position $P_n$ of the nth marker using the weight coefficient $W_n$.

Figure 9:
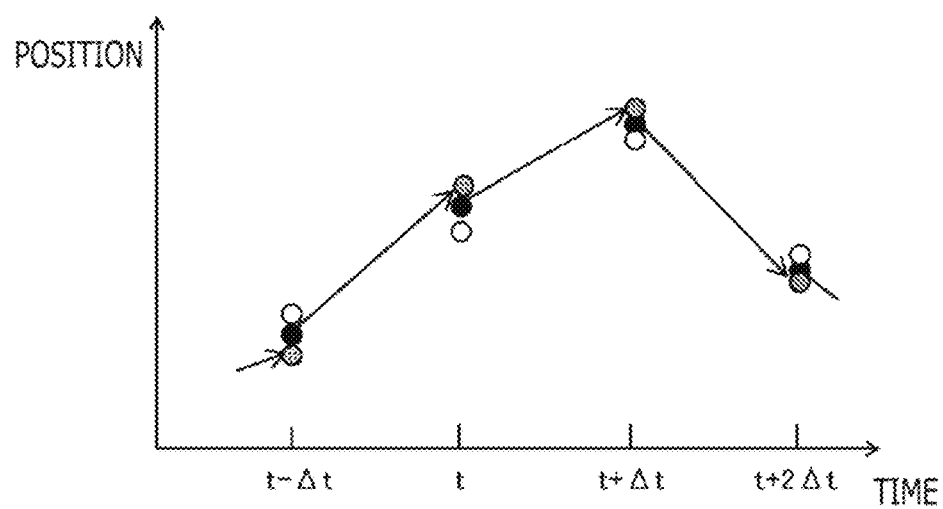
FIG. 9 is a diagram of assistance in explaining relation between the estimation of positions by a position and attitude estimating section and image photographing times in the present embodiment.

[Math. 2]

$$Position_{image} = \frac{\sum_{n=1}^{N} \{W_n \cdot (P_n + offset_n)\}}{\sum_{n=1}^{N} W_n} \quad \text{(Equation 2)}$$

where N is a total number of markers, and offset$_n$ is a distance in the three-dimensional space from the gravity center position of the nth marker to the target point. In order to obtain the weight coefficient $W_n$ with high accuracy, the position and attitude estimating section 140 estimates the position and attitude of the HMD 18 at the same time as a time of photographing an image. The estimated position information used when the filtering section 142 filters the position coordinates Position$_{image}$ of the target point which are obtained by Equation 2 is also made to coincide with the image photographing time. FIG. 9 is a diagram of assistance in explaining relation between the estimation of the position by the position and attitude estimating section 140 and the image photographing time.

Letting Δt be the frame rate, frames are photographed at times t−Δt, t, t+Δt, t+2Δt, . . . , as depicted on a time axis in the figure. Hence, the position coordinates Position$_{image}$ of the target point which are obtained by Equation 2 from the photographed image are also obtained for those times. In the figure, the position coordinates are represented by white circles. Meanwhile, the position and attitude estimating section 140 obtains angular velocity and acceleration from the IMU sensor 64, and obtains the position and attitude of the HMD 18 by using the angular velocity and the acceleration.

In the case of the position coordinates depicted in the figure, when position coordinates corresponding to each photographing time which are represented by a black circle are set as a starting point, and an amount of displacement for Δt, the amount of displacement being obtained from integral operation of the acceleration, is added, position coordinates corresponding to a next photographing time can be estimated as indicated by an arrow. An estimated value at this time is represented by a shaded circle. The filtering section 142 synthesizes, at a predetermined ratio, the position coordinates Position$_{image}$ (white circle) obtained from an image and position coordinates (shaded circle) at the same time which are estimated from the output value from the IMU sensor 64, and thereby obtains the position coordinates after filtering at the time as indicated by a black circle. Letting Position$_{sensor}$ be the position coordinates estimated by the position and attitude estimating section 140, and letting k be the synthesizing ratio of the position coordinates, position coordinates Position$_{out}$ after the filtering are obtained as follows.

[Math. 3]

$$Position_{out} = k \cdot Position_{sensor} + (1-k) \cdot Position_{image} \quad \text{(Equation 3)}$$

The position coordinates Position$_{out}$ after the filtering are supplied as final position coordinates at the time to the output data generating section 146, and are given to the position and attitude estimating section 140 to be used as a starting point for estimating the position at a next photographing time. In addition, the position and attitude estimating section 140 determines the disposition of the target object model of the HMD 18 depicted in FIG. 8 at the next photographing time by using the position coordinates Position$_{out}$ after the filtering.

At this time, when the attitude at the previous photographing time is determined such that the centers of gravity of the markers of the target object model of the HMD 18 at the position coordinates Position$_{out}$ coincide with the gravity center positions of the respective markers obtained from the photographed image, the attitude at the next photographing time can be estimated correctly with the attitude at the previous photographing time as a starting point. The weight adjusting section 134 determines the weight coefficient of each marker as depicted in FIG. 8 by using these estimated values.

The synthesizing ratio k in Equation 3 means the strength of filtering for the positional information obtained from the photographed image, whereas (1−k) means a feedback ratio of the positional information obtained from the photographed image when the positional information is estimated from the output value of the IMU sensor 64. Hence, as described above, the closer to one the synthesizing ratio k is, the higher the accumulation ratio of errors due to integral operation of the output value of the sensor is. The closer to zero the synthesizing ratio k is, the greater the effect of errors as described above in the positional information obtained from the photographed image is.

Figure 10:
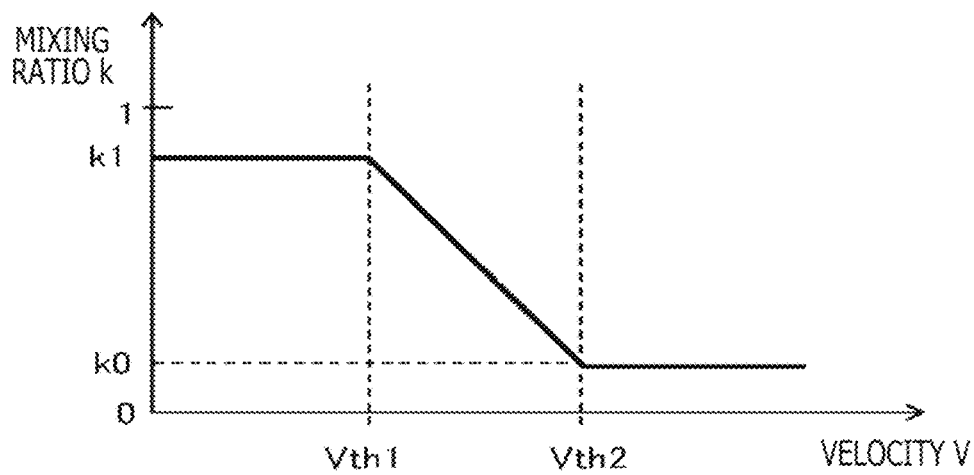
FIG. 10 is a diagram of assistance in explaining an example of a method of adjusting the synthesizing ratio of positional information estimated from an output value of a sensor to positional information obtained from a photographed image in the present embodiment.

Hence, a balance therebetween is maintained suitably by adjusting the synthesizing ratio k appropriately. FIG. 10 is a diagram of assistance in explaining an example of a method of adjusting the synthesizing ratio of the positional information estimated from the output value of the sensor to the positional information obtained from the photographed image. In the present example, the synthesizing ratio k is changed according to the velocity of the HMD 18. Here, a value obtained on the basis of the output value of the IMU sensor 64 is used as the velocity V. This is because when the velocity is obtained from the positional information obtained from the photographed image, there is a possibility that the velocity itself includes errors due to errors as described above and concealment by another object.

As depicted in the figure, two threshold values, that is, a first threshold value Vth1 and a second threshold value Vth2

(where Vth1<Vth2) are set by experiment or the like for the velocity V. k=k1 when the velocity V of the HMD 18 is in a range of 0≤V<Vth1. k=k2 when the velocity V is in a range of Vth2≤V (where k2<k1). In a range of Vth1≤V<Vth2 as intermediate velocities between those ranges, k is linearly decreased from k1 to k0 with increase in the velocity V. Here, suitable values are set also as the maximum value k1 and the minimum value k0 of k by experiment or the like.

Such adjustment makes the filter have a strong effect in the low-velocity region in which discontinuity and vibration due to errors in the positional information are recognized easily. On the other hand, in the high-velocity region in which discontinuity and vibration are not recognized easily, the feedback ratio of the positional information obtained from the photographed image is increased, thereby making it easy to resolve accumulated errors in the positional information obtained from the output value of the sensor. It is thus possible to maintain an excellent state from a long-term viewpoint, including the presence or absence of movement of the user. Incidentally, a manner of changing the synthesizing ratio k is not limited to that depicted in the figure, but three or more threshold values may be provided, or k may be changed so as to describe a curve. In addition, k may be changed discretely by, for example, setting a constant to each velocity range.

Figure 11:
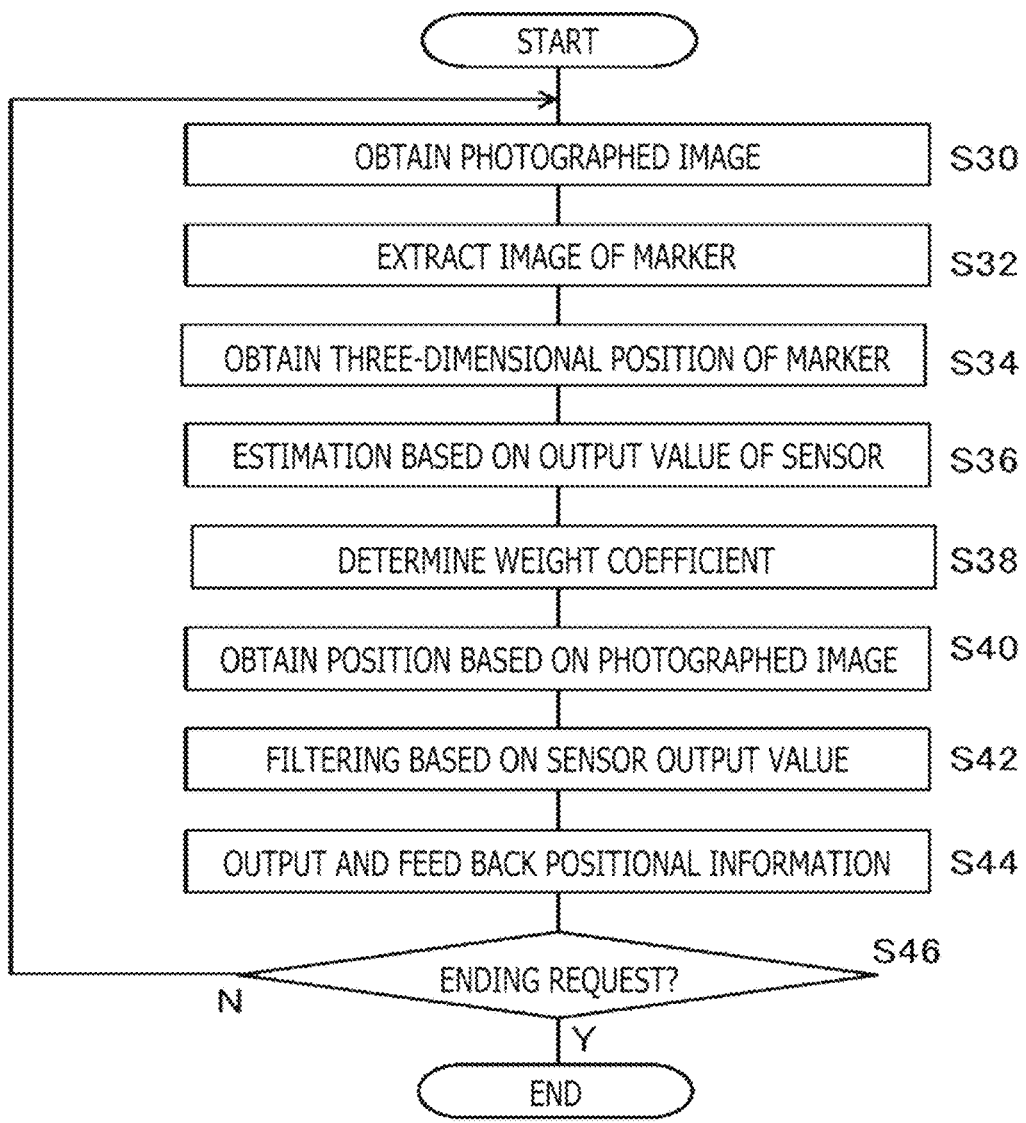
FIG. 11 is a flowchart depicting a processing procedure in which the information processing device in the present embodiment outputs the position coordinates of a target point of the HMD by using a photographed image and the output value of an inertial measurement unit (IMU) sensor.

Description will next be made of operation of the information processing device that can be implemented by the configuration described thus far. FIG. 11 is a flowchart depicting a processing procedure for outputting the position coordinates of the target point of the HMD 18 by the information processing device 10 by using a photographed image and the output value of the IMU sensor. This flowchart is started in a state in which the user has started the information processing device 10 and the imaging device 12 has started photographing. First, the photographed image obtaining section 130 obtains a photographed image of a first frame from the imaging device 12 (S30). Next, the marker position obtaining section 132 extracts an image of a marker from the photographed image (S32). In the case where the photographed image is a stereo image, the image is extracted from both images of the stereo image.

Further, the marker position obtaining section 132 obtains the position of the center of gravity of the marker in the three-dimensional space on the basis of the extracted image of the marker (S34). In the case of the stereo image, as described with reference to FIG. 3, three-dimensional position coordinates can be obtained by identifying corresponding images in the left and right images, deriving a distance from the imaging plane on the basis of a parallax between those images, and performing back projection into the three-dimensional space. Even in a case of an image of a monocular camera, the three-dimensional position coordinates can be obtained when the distance is estimated from the size of the image of the marker. Meanwhile, the position and attitude estimating section 140 estimates the position and attitude of the HMD 18 by using the output value of the IMU sensor 64 (S36).

Incidentally, for a first photographed image, starting points of the position and the attitude may be set as appropriate, or estimation processing itself may be started from a frame at a next time. In the latter case, the positional information is obtained from only the photographed image in the first frame, and the illustrated flowchart is started from the photographed image of a next frame. In addition, the processing of S36 may be performed in parallel with the processing of S32 and S34. Next, the weight adjusting section 134 disposes the target object model of the HMD 18 in the virtual three-dimensional space according to the position and the attitude estimated by the position and attitude estimating section 140, and determines the weight coefficient by Equation 1 (S38).

The target point position calculating section 136 next obtains the position coordinates of the target point on the basis of the photographed image by Equation 2 by using the determined weight coefficient (S40). The filtering section 142 then filters the positional information obtained in S40 by Equation 3 using the positional information estimated from the output value of the IMU sensor 64 by the position and attitude estimating section 140 in S36 (S42). At this time, the filtering section 142 obtains the value of the velocity of the HMD 18, the value being used for estimation by the position and attitude estimating section 140, and determines the synthesizing ratio k according to the value.

The filtering section 142 outputs the thus obtained positional information after the filtering to the output data generating section 146, and makes the positional information fed back to the position and attitude estimating section 140 (S44). As described above, the output data generating section 146 may perform information processing as appropriate using the obtained positional information, generate a display image, and output the display image to the display device 16, or may output the positional information itself to another information processing device. However, illustrations of such processing are omitted in the figure. When there is no need to end the processing by performing an operation of ending the processing on the part of the user, for example (N in S46), the processing of S30 to S44 is repeated for the photographed image of a next frame. When a need to end the processing arises, all of the processing is ended (Y in S46).

Figure 12:
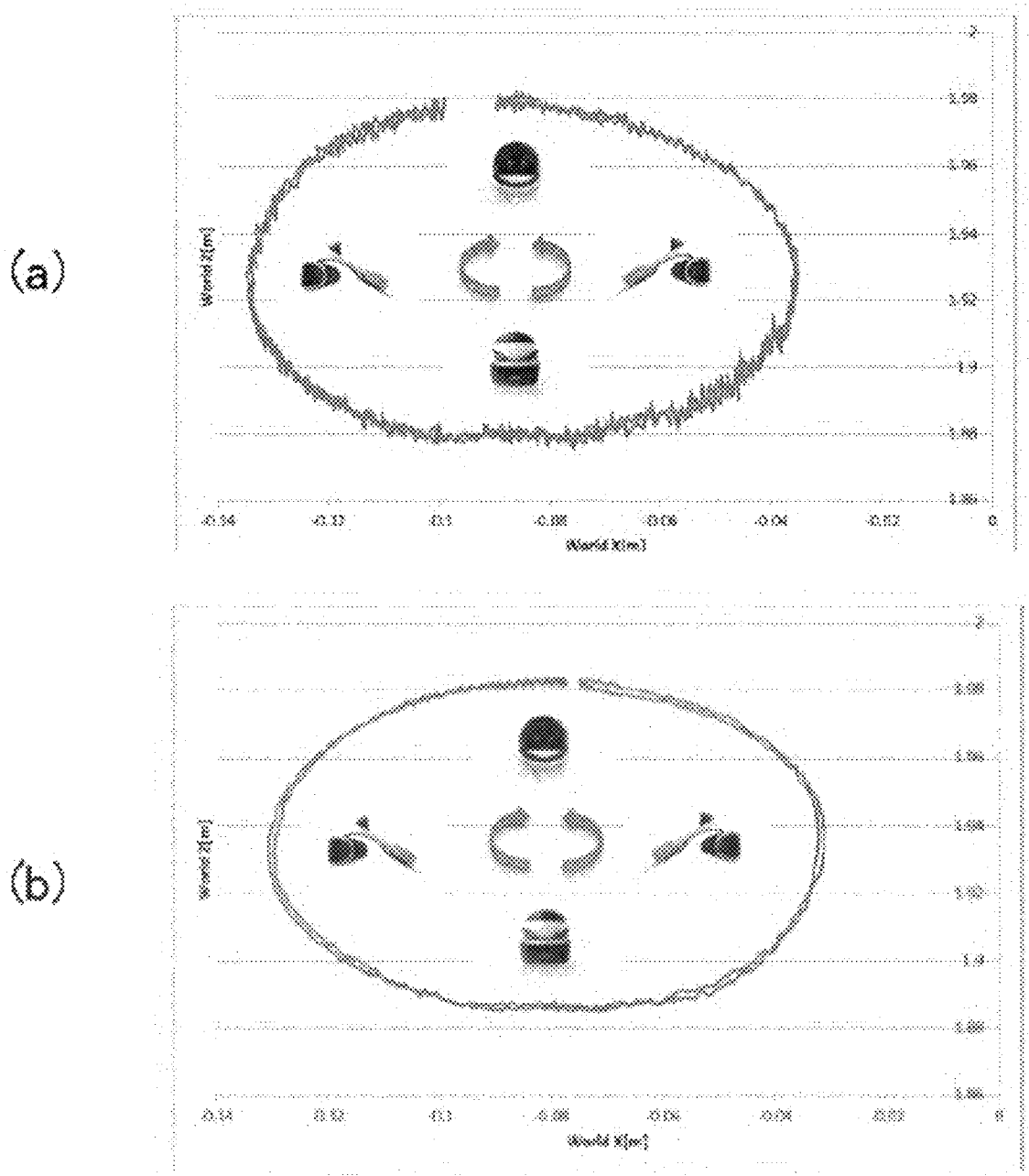
FIG. 12 is diagrams illustrating an effect in a case where the present embodiment is applied.

FIG. 12 illustrates an effect in a case where the present embodiment is applied. The figure depicts the positional information output when the HMD 18 fixed on a pan-tilter is rotated about a yaw axis. In the figure, an axis of abscissas indicates the horizontal direction of an image, and an axis of ordinates indicates a distance from the imaging device 12. When the HMD 18 is rotated, the position coordinates of the target point corresponding to the middle of the forehead exhibit changes close to a roughly circular shape. (a) represents position coordinates obtained from only the photographed image, and fine vibrations are recognized as a whole. On the other hand, a result of (b) in which the present embodiment is introduced indicates that vibrations of the position coordinates are suppressed greatly.

According to the present embodiment described above, in a technology of obtaining the three-dimensional positional information of the target object by extracting images of markers from a photographed image, the positional information is filtered by using the output value of the IMU sensor. Here, accurate filtering can be performed without any temporal displacement by estimating the positional information adjusted to the photographing time from the output value of the IMU sensor. It is thereby possible to reduce errors caused by positional relation between the original image of a marker and a color detected by a sensor constituting each pixel and a change in the apparent shape and size of the marker, and thus stabilize accuracy of obtainment of the positional information.

In addition, the target object model of the target object is disposed in the virtual space by using information on the position and the attitude estimated from the IMU sensor, and the weight coefficient that determines a degree of contribution to calculation of the position coordinates of the target point in the target object is determined for each marker from the angle between the surface of each marker and the imaging plane and the area of the image at a time of projecting the marker onto the imaging plane. Thus, even in the case of the positional information before filtering, an error due to the appearance of the marker can be minimized. That is, even in a case where filtering is not introduced, it is possible to stabilize accuracy at a time of obtaining the position coordinates of the target object from images of markers in a photographed image.

Because of these configurations, even when there are a small number of markers, and even in a case of markers whose apparent shape changes according to orientation thereof, the positional information of the target object equipped with the markers can be obtained stably. As a result, it is possible to impart flexibility to design of the target object equipped with markers such as the HMD or the like, and reduce manufacturing cost. In addition, operation cost can be reduced because of the small number of markers, and also power consumption can be reduced in a case where the markers are light emitting bodies.

Embodiment 2

Figure 13:
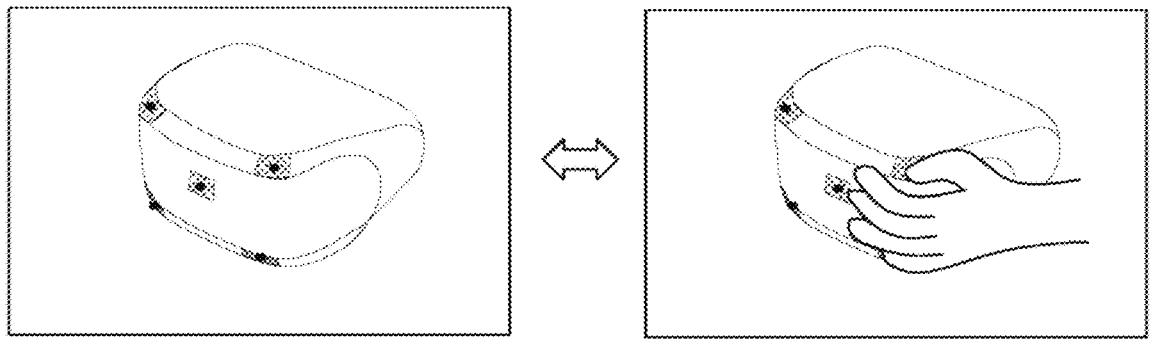
FIG. 13 is diagrams schematically depicting conditions in which concealment of markers occurs.

In a present embodiment, concealment of markers is further taken into consideration in conditions similar to those of the first embodiment. FIG. 13 schematically depicts conditions in which concealment of markers occurs. A photographed image of (a) depicts a state in which the whole of the HMD 18 is photographed. In this case, as described in the first embodiment, when the appearance of each marker is identified by using the target object model, an error included in the positional information of the marker can be estimated, and therefore the calculation equation for the position coordinates of the target point can be adjusted accordingly. On the other hand, in a photographed image of (b), a hand of the user comes between the imaging plane and the HMD 18, so that two of the five markers that are originally to be seen are concealed.

Such concealment is not considered in error evaluation using the target object model, and it is also difficult to predict the occurrence of such concealment. When some of the markers are concealed suddenly, the number of markers whose centers of gravity are obtained changes suddenly, and error characteristics vary, so that the position coordinates of the target point can change discontinuously. In addition, in a case of a marker having a relatively large size, the position coordinates of the center of gravity of the marker includes a large error when a part of the marker is concealed.

Accordingly, in the present embodiment, the presence or absence and ratio of concealment are determined according to a ratio of the area of an image of an actually appearing marker to the area of the marker that is originally to be seen, and the gravity center position of a marker concealed by a predetermined reference or more is not used for calculation of the position coordinates of the target point. The subsequent description will be made focusing on points different from those of the first embodiment. The internal circuit configuration and the configuration of functional blocks of an information processing device in the present embodiment may be similar to those depicted in FIG. 5 and FIG. 7 in the first embodiment.

Figure 14:
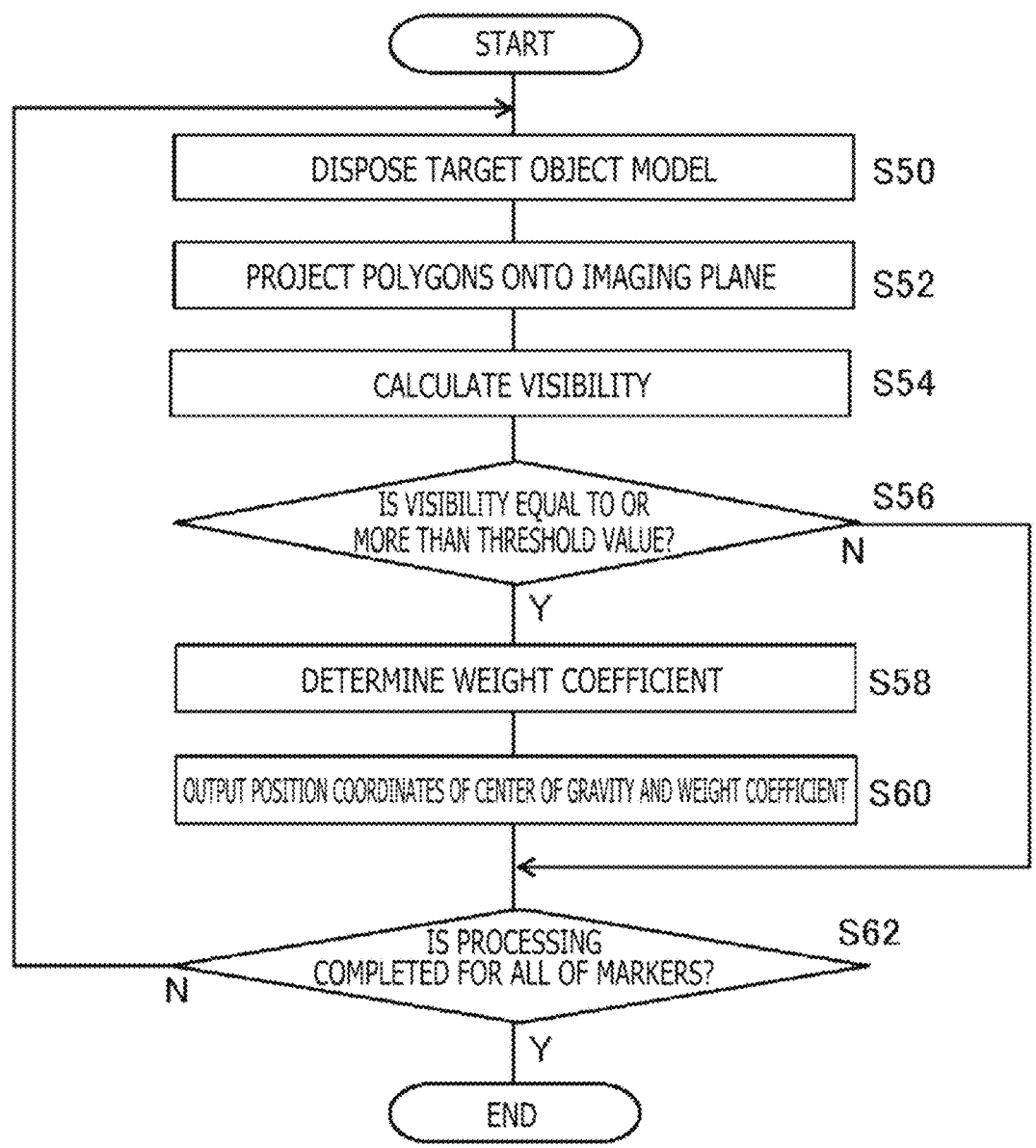
FIG. 14 is a flowchart depicting a processing procedure in which the weight adjusting section in the present embodiment recognizes concealment of a marker, and outputs only information that can be used for calculation of the position coordinates of the target point to a target point position calculating section.

Here, the above-described functions in the present embodiment are assigned to the weight adjusting section 134. FIG. 14 is a flowchart depicting a processing procedure in which the weight adjusting section 134 in the present embodiment identifies concealment of a marker, and outputs only information that can be used for calculation of the position coordinates of the target point to the target point position calculating section 136. First, as in the first embodiment, the target object model of the HMD 18 is disposed in the virtual three-dimensional space including the imaging plane on the basis of information on the position and attitude of the HMD 18 at the same time as a photographing time which are estimated by the position and attitude estimating section 140 (S50).

Next, polygons constituting each marker on the target object model are each projected onto the imaging plane (S52). At this time, a polygon with an inner product of the projection vector and the normal vector equal to or less than a predetermined threshold value is determined not to be seen from the imaging plane, and is excluded from projection targets. Next, visibility is calculated as an index indicating a degree of concealment for each marker (S54). The visibility basically indicates the area ratio of an image of the marker actually appearing in the photographed image to an image of the marker that is originally to be present, as described above. However, normalization is performed so that characteristics of the visibility do not change according to the position and appearance of the marker. A concrete example will be described later.

When the visibility obtained in S54 is equal to or more than a predetermined threshold value (Y in S56), a degree of concealment is determined to be small, the weight coefficient of the marker is determined by using Equation 1 as described in the first embodiment (S58), and the weight coefficient is output to the target point position calculating section 136 together with the position coordinates of a center of gravity (S60). When the visibility does not exceed the threshold value, on the other hand, the degree of concealment is determined to be large, and the position of the center of gravity of the marker is not output (N in S56). The target point position calculating section 136 thereby calculates the target point using only the gravity center positions of markers not covered or covered to a small degree.

The processing of S50 to S60 is repeated for all of the markers (N in S62). When the processing for all of the markers is completed, the processing for the photographed image is ended (Y in S62). Incidentally, the processing procedure illustrated here can be combined with the first embodiment by replacing S38 in the flowchart depicted in FIG. 11. In addition, when only evaluation based on the visibility in the present embodiment is performed, the processing of S58 may be omitted, and only the gravity center positions of markers not excluded may be output in S60. This also has an effect of reducing an error due to concealment.

The visibility will next be described. As described above, when the visibility is simply defined by the area ratio, the value is changed also by a factor other than concealment, and the degree of concealment may not be said to be indicated precisely. First, an image in a photographed image basically tends to be larger than an image on the model which image is obtained by projecting the target object model onto the imaging plane. This results from, for example, facts that, as depicted in FIG. 4, the area of an image is determined in pixel units in the photographed image, that color tends to be expanded to the periphery of an original image due to interpolation with peripheral pixels in an image after demosaicing, and that the image tends to be enlarged due to correction of lens distortion.

Figure 15:
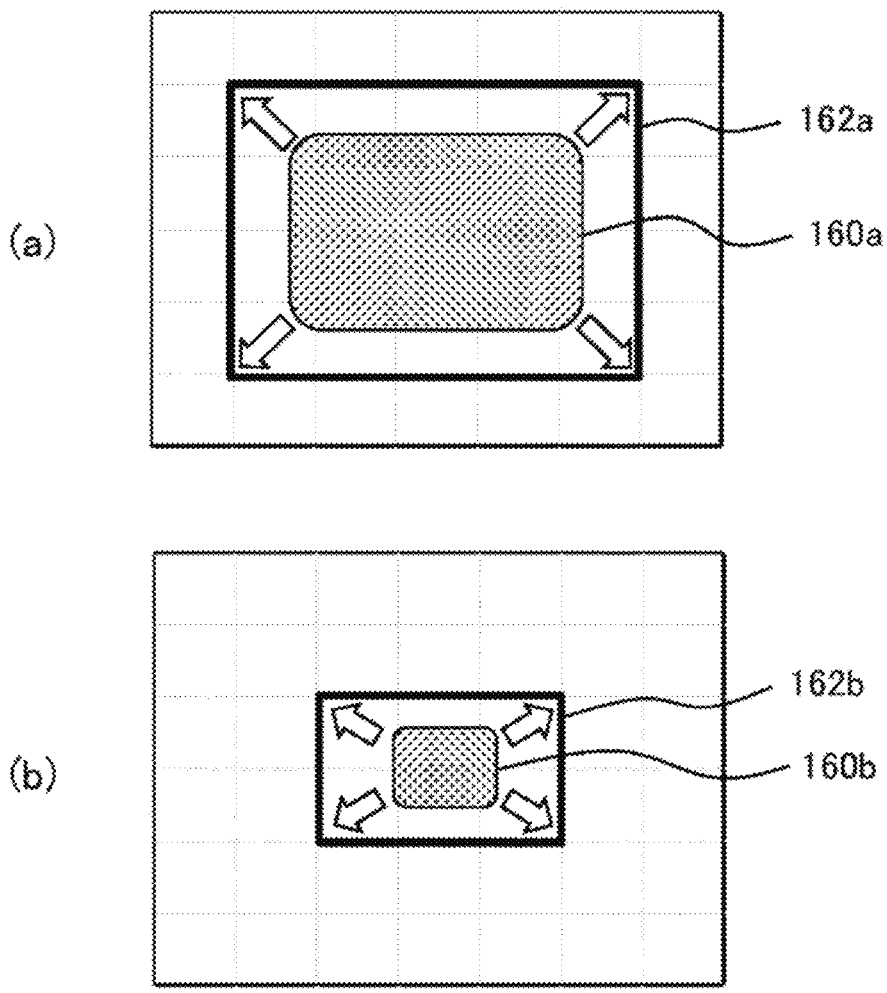
FIG. 15 is diagrams schematically depicting a state in which original images of markers are expanded in a photographed image after demosaicing.

In addition, the ratio of the area expanded due to such factors changes according to the size of the image in the photographed image. FIG. 15 schematically depicts a state in which original images of markers are expanded in a photographed image after demosaicing. Both (a) and (b) of the figure depict an image plane, and regions enclosed by internal lattices represent respective pixels. Regions 160a and 160b indicated by shading are images of original markers, and are expanded to regions 162a and 162b, respectively, because color is determined in pixel units in the photographed image and due to interpolation with peripheral pixels.

Here, supposing that the regions 160a and 160b are the areas of images on the model, and that the regions 162a and 162b are the areas of the images in the actual photographed image, and when the ratios of expanded areas are calculated, the ratio of the expanded area in the case of (b) in which the image has a small size tends to be high as compared with the case of (a) in which the original image has a large size. That is, when the visibility is defined as (area of actual image/area of image on model), the visibility changes according to the size of the image even in a state in which there is no concealment. In addition, when an image has a small size, large variations occur in the expansion ratio depending on positional relation between the image and pixel boundaries, and the visibility also varies as a result.

A marker having a large angle with respect to the imaging plane or a marker having a large distance from the imaging plane has a small image size. Accordingly, in order to suppress effects of differences in those conditions, the visibility Dn of the nth marker is defined as follows.

[Math. 4]

$$D_n = \frac{(v_{pro}(n) \cdot v_{normal}(n)) \cdot S_{image}(n)}{S(n)} \quad \text{(Equation 4)}$$

where $v_{pro}(n)$ and $v_{normal}(n)$ are respectively the projection vector and the normal vector of the nth marker, and $S_{image}(n)$ is the area of an image of the nth marker in the actual photographed image. Equation 1 uses the projection vector and the normal vector of each polygon, whereas Equation 4 uses the projection vector and the normal vector of each marker. Hence, an average value of the projection vectors of the polygons as projection targets in S52 in FIG. 14 and an average value of the normal vectors of the polygons are set as the projection vector $v_{pro}(n)$ and the normal vector $v_{normal}(n)$ of each marker.

The area $S_{image}(n)$ of the actual image is multiplied by an inner product of the projection vector and the normal vector of the whole of the marker. Thus, even when $S_{image}(n)$ varies in an increasing direction, the effect thereof can be suppressed more for a marker that has a large angle and thus tends to include an error. In addition, the denominator S(n) is the area of the image of the nth marker when the target object model is projected onto the imaging plane. This is a value obtained by summing the areas of the images of the polygons projected in S52 for each marker. However, a resolution is set in pixel units.

That is, pixel regions are set with the same resolution as the actual photographed image in the imaging plane onto which the markers on the target object model are projected, and the image on the model which is originally obtained with a resolution finer than pixels is set as an image in pixel units. When the example of FIG. 15 is used, the regions 162a and 162b in pixel units are created in a pseudo manner from the regions 160a and 160b of the images on the model, and the areas thereof are selected as S(n). When the visibility is thus defined, a degree of concealment can be evaluated under the same conditions irrespective of the size of the images.

FIG. 16 depicts an effect of using the normalized visibility. The figure indicates changes in the area and visibility of images of markers with respect to a distance of the HMD 18 from the imaging plane. In (a) and (b), markers having different positions on the HMD 18, or in turn different angles with respect to the imaging plane are set as targets. In graphs indicating areas depicted on a left side, data 170a and 170b represents the areas of images of the markers in an actual photographed image, and data 172a and 172b represents the areas of the images on the model which are formed by projecting the target object model onto the imaging plane.

In either case, the larger the distance from the imaging plane is, the more the area is decreased. However, for reasons described above, the area of an image in the photographed image always becomes larger than the area of the image on the model, and the larger the distance is, the more the ratio of deviation therebetween is increased. When the area ratio between these areas is adopted as the visibility as it is, the visibility is increased with the distance, as in data 176a and 176b in graphs on a right side. In addition, dependence of the visibility on the distance differs between data 176a and data 176b because of different marker angles.

That is, the visibility based on such a definition depends not only on the degree of concealment but also on the distance of the marker and the angle with respect to the imaging plane. Accordingly, first, when the images on the model are expanded to pixel units as described above, the areas approach the data 170a and 170b of the actual images as in data 174a and 174b in the graphs indicating the areas. When the visibility is defined as in Equation 4 with the areas set as S(n), dependence on the distance and difference due to the angle are substantially resolved as in data 178a and 178b in the graphs of the visibility on the right side.

Figure 17:
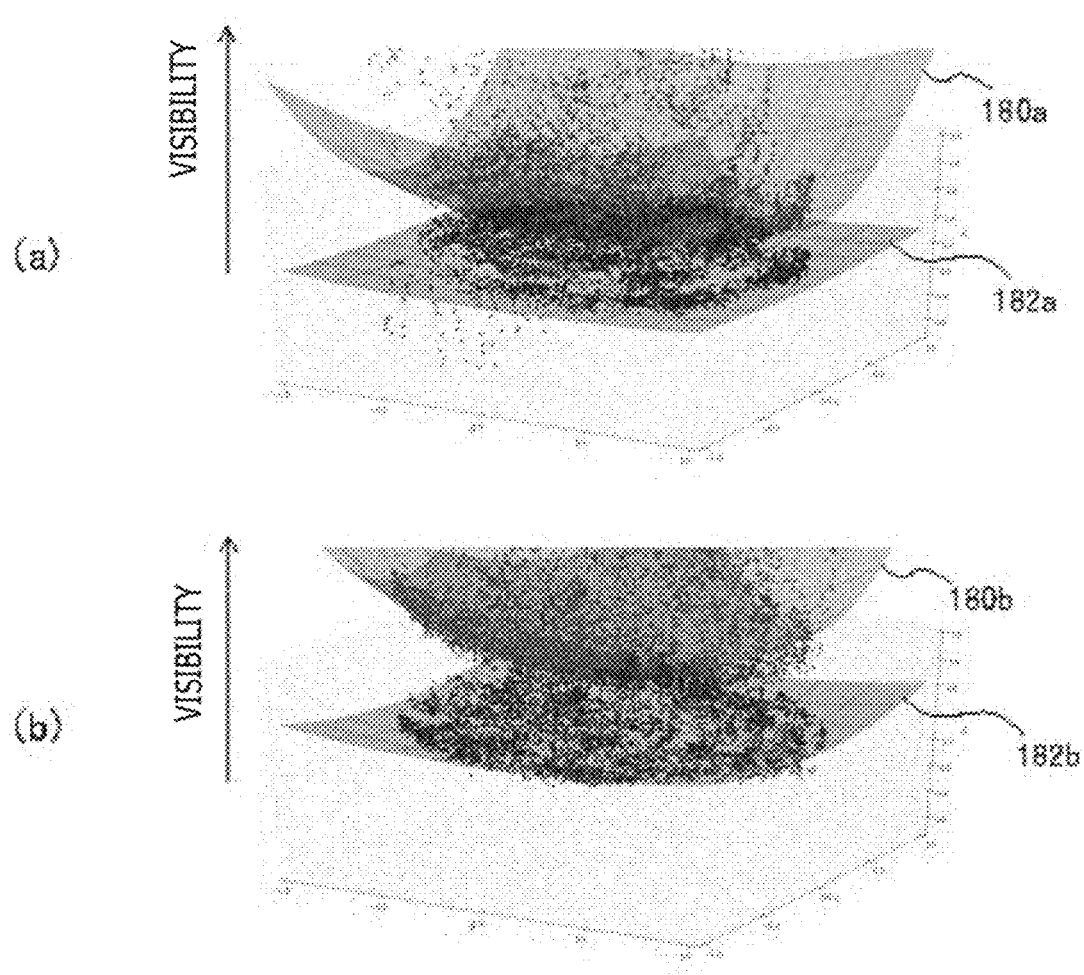
FIG. 17 is a diagram depicting changes in the visibility when the attitude of the HMD is changed variously in the present embodiment.

FIG. 17 depicts changes in the visibility when the attitude of the HMD 18 is changed variously. Specifically, two-axis rotation angles are represented by position coordinates of a horizontal plane as an attitude parameter, and the visibility in each attitude is plotted in a vertical axial direction. In addition, curved surfaces obtained by approximating plotted point groups are depicted. In (a) and (b), the same markers as respectively depicted in (a) and (b) in FIG. 16 are set as targets. Surfaces 180a and 180b represent the case where the area ratio of an image in a photographed image with respect to an image on the model is simply set as the visibility. Flat surfaces 182a and 182b represent the case where Equation 4 is set as the visibility. The visibility of Equation 4 indicates that there is a small dependence on the attitude of the HMD 18 and the angle of the markers, and that the visibility of Equation 4 can be used as an index purely indicating the degree of concealment.

Figure 18:
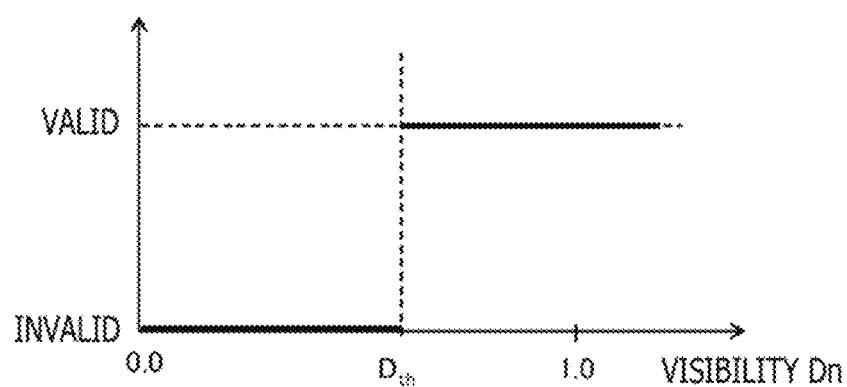
FIG. 18 is a diagram illustrating a reference provided for the visibility in order to determine whether positional information in the present embodiment is valid/invalid.

FIG. 18 illustrates a reference provided for the visibility in order to determine whether the positional information is valid/invalid. The use of the normalized visibility as described above enables valid/invalid determination based on simple threshold value determination irrespective of the size of images of the markers. Specifically, a threshold value $D_{th}$ is set for the visibility by experiment or the like. Then, when the visibility Dn of each marker is in a range of $0 \leq D_n < D_{th}$, the positional information of the marker is determined to be invalid. When the visibility Dn is in a range of $D_{th} \leq D_n$, the positional information of the marker is determined to be valid, and is used for calculation of the position of the target point. Incidentally, as depicted in the figure, the visibility Dn may exceed 1.0 due to expansion of the image in the photographed image as described above.

Also in the present embodiment, as described in the first embodiment, the position coordinates of the target point may be filtered by using the position coordinates estimated by the position and attitude estimating section 140. In this case, the positional information based on the photographed image which is calculated by the target point position calculating section 136 reflects a result of determination of whether or not the markers are concealed. When the positional information of three markers among the five markers is invalid due to concealment, for example, the position coordinates of the target point are calculated from only the position coordinates of the centers of gravity of the two remaining markers. As a result of error characteristics being thus changed suddenly, a result of processing in a subsequent stage such as a display image or the like may be changed discontinuously.

Figure 19:
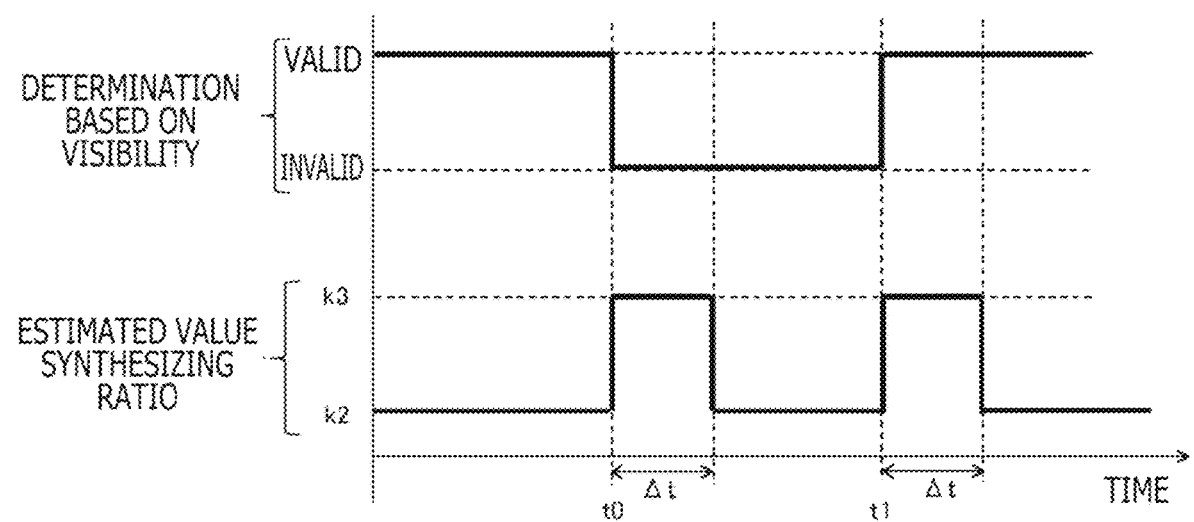
FIG. 19 is a diagram illustrating a timing diagram in which the synthesizing ratio of estimated position information is controlled on the basis of positional information valid/invalid determination based on the visibility in the present embodiment.

Accordingly, a seamless state transition is realized by increasing the synthesizing ratio k of the position coordinates estimated by the position and attitude estimating section 140 for a predetermined time from a time point that concealment occurs or a stage immediately before the time point. FIG. 19 illustrates a timing diagram in which the synthesizing ratio of the estimated position information is controlled on the basis of the positional information valid/invalid determination based on the visibility. An upper part of the figure illustrates timing in which the weight adjusting section 134 switches between validity and invalidity of the positional information of a certain marker according to the visibility threshold value determination. A lower part depicts timing in which the filtering section 142 correspondingly changes the mixing ratio k of the positional information estimated by the position and attitude estimating section 140.

As depicted in the figure, suppose that the degree of concealment of the certain marker is increased at time t0, and that the positional information of the certain marker is changed from validity to invalidity. At this time, the filtering section 142 increases the synthesizing ratio from k2 to k3 (k3>k2) at the time t0, and returns the synthesizing ratio to the original synthesizing ratio k2 after the passage of a predetermined time Δt. Further, also when the concealment is determined to be resolved at a subsequent time t1, and the positional information is changed from invalidity to validity, the filtering section 142 increases the synthesizing ratio from k2 to k3 at the time t1, and returns the synthesizing ratio to the original synthesizing ratio k2 after the passage of a predetermined time Δt.

The positional information valid/invalid determination as depicted in the figure is made for each marker. Thus, the filtering section 142 increases the synthesizing ratio k for a predetermined time Δt each time concealment occurs at one of the markers or the concealment is resolved. This can suppress sudden changes in positional information, or in turn information processing and a display image using the positional information, according to an increase or a decrease in the number of markers used for calculation of the positional information of the target point.

Incidentally, because the positional information valid/invalid determination for each marker is made on the basis of the threshold value $D_{th}$ for the visibility, the filtering section 142 can adjust the mixing ratio in a stage before valid/invalid switching is performed when the filtering section 142 is configured to be able to check the visibility. Specifically, other threshold values $D_{th1}$ and $D_{th2}$ (where $D_{th1} > D_{th} > D_{th2}$) are set in advance for the visibility, and at a time of switching from validity to invalidity, the mixing ratio k is increased for a predetermined time when the visibility becomes equal to or lower than the first threshold value $D_{th1}$. At a time of switching from invalidity to validity, the mixing ratio k is increased for a predetermined time when the visibility becomes equal to or higher than the second threshold value $D_{th2}$.

In addition, in the illustrated example, the mixing ratio k is set to one of the constants k2 and k3. However, the mixing ratio k is not intended to be limited to this, but may be increased or decreased gradually. Alternatively, a plurality of mixing ratios k may be set, and stepwise increases or decreases may be performed. The mixing ratio k may be changed according to the number of invalid markers. Further, a combination with the adjustment of the mixing ratio on the basis of the velocity of the HMD 18 as described in the first embodiment may be made. In this case, the adjustment as depicted in the figure may be performed only when the velocity of the HMD 18 is lower than a predetermined threshold value. Alternatively, the adjustment as depicted in the figure may be performed irrespective of the velocity of the HMD 18, and further the adjustment depending on the velocity as depicted in FIG. 10 may be allowed to coexist.

According to the present embodiment described above, the visibility indicating the degree of concealment of a marker is introduced, and the positional information of a marker with a large degree of concealment is excluded from targets used for calculation of the positional information of the target point. Thus, the positional information of the target object can be obtained by using only markers of high reliability, so that accuracy can be stabilized even when markers of relatively large sizes are used. When the number of markers used for calculation of the positional information of the target point is changed, the synthesizing ratio of the positional information estimated from the IMU sensor is temporarily increased. It is thereby possible to suppress sudden changes in error characteristics, and discontinuous variation in output data.

In addition, as the visibility for evaluating the degree of concealment, a normalized parameter is used so that dependence on changes in size of an image due to the attitude and distance of the marker does not occur. This simplifies the processing of determining whether the positional information is valid/invalid, and enables precise determination without an increase in a load of processing. In addition, concealment occurrence detection sensitivity can be uniformized even when the size and shape of the marker differ. Thus, a degree of freedom of design can be increased with a small effect on processing accuracy. Further, a combination with the first embodiment is possible, and therefore the effects described above in the first embodiment can also be obtained similarly.

The present invention has been described above on the basis of embodiments thereof. The foregoing embodiments are illustrative, and it is to be understood by those skilled in the art that combinations of constituent elements and processing processes of the embodiments are susceptible of various modifications, and that such modifications also fall within the scope of the present invention.

REFERENCE SIGNS LIST

10 Information processing device, 12 Imaging device, 18 HMD, 22 CPU, 24 GPU, 26 Main memory, 64 IMU sensor, 130 Photographed image obtaining section, 132 Marker position obtaining section, 134 Weight adjusting section, 136 Target point position calculating section, 138 Sensor data obtaining section, 140 Position and attitude estimating section, 142 Filtering section, 144 Model data storage section, 146 Output data generating section.

INDUSTRIAL APPLICABILITY

As described above, the present invention is applicable to various kinds of information processing devices such as a game device, an imaging device, an image display device, and the like, information processing systems including one of those devices, and the like.

The invention claimed is:

1. An information processing device for obtaining positional information of a target object having a plurality of markers, the information processing device comprising:
   a marker position obtaining section configured to extract images of the markers from a photographed image obtained by photographing the target object, and obtain position coordinates of representative points of the markers in a three-dimensional space;
   a target point position calculating section configured to obtain position coordinates of the target object using the position coordinates of the representative point of each of the markers;
   a position estimating section configured to estimate the position coordinates of the target object on a basis of an output value of a sensor included in the target object;
   a filtering section configured to determine final position coordinates of the target object by synthesizing, at a predetermined ratio, the obtained position coordinates of the target object, the obtained position coordinates being obtained by the target point position calculating section, and the estimated position coordinates of the target object, the estimated position coordinates being estimated by the position estimating section, and output the final position coordinates; and
   a weight adjusting section configured to determine a weight coefficient for each of the markers on a basis of a parameter corresponding to an area of an image of the marker on a model, the image being formed by projecting a target object model of the target object disposed in a virtual three-dimensional space onto an imaging plane and an angle between the marker in the target object model and the imaging plane,
   wherein the target point position calculating section calculates the position coordinates of the target object after applying the weight coefficient to the position coordinates of the representative point of each of the markers.

2. The information processing device according to claim 1, wherein the filtering section changes a synthesizing ratio of the estimated position coordinates of the target object according to velocity of the target object.

3. The information processing device according to claim 1, wherein
   the filtering section sequentially determines the position coordinates of the target object in an image of each frame photographed at a predetermined frame rate, and
   by setting, as a starting point, the position coordinates of the target object in an image of a previous frame, the position coordinates being output by the filtering section, and adding an amount of displacement of the target object up to a next frame, the amount of displacement being obtained on a basis of the output value of the sensor, the position estimating section estimates the position coordinates of the target object in an image of the next frame.

4. The information processing device according to claim 1, wherein the weight adjusting section determines the weight coefficient for each of the markers by obtaining the parameter corresponding to the area of the image on the model and the angle for each polygon constituting the marker in the target object model, and integrating the parameters.

5. The information processing device according to claim 1, wherein
   the marker position obtaining section sequentially obtains the position coordinates of the representative points in an image of each frame photographed at a predetermined frame rate,
   on a basis of the position coordinates of the target object in an image of a previous frame, the position coordinates being output by the filtering section, and the output value of the sensor, the position estimating section estimates a position and an attitude of the target object in an image of a next frame, and
   the weight adjusting section determines the weight coefficient by using the target object model in the estimated position and the estimated attitude.

6. A positional information obtaining method performed by an information processing device for obtaining positional information of a target object having a plurality of markers, the positional information obtaining method comprising:
   extracting images of the markers from a photographed image obtained by photographing the target object, and obtaining position coordinates of representative points of the markers in a three-dimensional space;
   obtaining position coordinates of the target object using the position coordinates of the representative point of each of the markers;
   estimating the position coordinates of the target object on a basis of an output value of a sensor included in the target object;
   determining final position coordinates of the target object by synthesizing, at a predetermined ratio, the obtained position coordinates of the target object, the obtained position coordinates being obtained in the obtaining, and the estimated position coordinates of the target object, the estimated position coordinates being estimated in the estimating, and outputting the final position coordinates; and
   determining a weight coefficient for each of the markers on a basis of a parameter corresponding to an area of an image of the marker on a model, the image being formed by projecting a target object model of the target object disposed in a virtual three-dimensional space onto an imaging plane and an angle between the marker in the target object model and the imaging plane,
   wherein the obtaining position coordinates includes calculating the position coordinates of the target object after applying the weight coefficient to the position coordinates of the representative point of each of the markers.

7. A non-transitory, computer readable storage medium containing a computer program, which when executed by a computer, causes the computer to obtain positional information of a target object having a plurality of markers by carrying out actions, comprising:
   extracting images of the markers from a photographed image obtained by photographing the target object, and obtaining position coordinates of representative points of the markers in a three-dimensional space;

obtaining position coordinates of the target object using the position coordinates of the representative point of each of the markers;

estimating the position coordinates of the target object on a basis of an output value of a sensor included in the target object;

determining final position coordinates of the target object by synthesizing, at a predetermined ratio, the obtained position coordinates of the target object, the obtained position coordinates being obtained in the obtaining, and the estimated position coordinates of the target object, the estimated position coordinates being estimated in the estimating, and outputting the final position coordinates; and determining a weight coefficient for each of the markers on a basis of a parameter corresponding to an area of an image of the marker on a model, the image being formed by projecting a target object model of the target object disposed in a virtual three-dimensional space onto an imaging plane and an angle between the marker in the target object model and the imaging plane, wherein the obtaining position coordinates includes calculating the position coordinates of the target object after applying the weight coefficient to the position coordinates of the representative point of each of the markers.

\* \* \* \* \*